United States Patent
Nagaraja et al.

(10) Patent No.: US 11,621,747 B2
(45) Date of Patent: Apr. 4, 2023

(54) RECEIVER BEAMFORMING FOR MEASUREMENTS

(71) Applicant: QUALCOMM Incorporated, San Diego, CA (US)

(72) Inventors: Sumeeth Nagaraja, San Diego, CA (US); Tao Luo, San Diego, CA (US); Sony Akkarakaran, Poway, CA (US); Makesh Pravin John Wilson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 746 days.

(21) Appl. No.: 15/707,901

(22) Filed: Sep. 18, 2017

(65) Prior Publication Data
US 2018/0123648 A1 May 3, 2018

Related U.S. Application Data

(60) Provisional application No. 62/414,652, filed on Oct. 28, 2016.

(51) Int. Cl.
*H04B 7/0426* (2017.01)
*H04B 7/06* (2006.01)
(Continued)

(52) U.S. Cl.
CPC ............ *H04B 7/043* (2013.01); *H04B 7/06* (2013.01); *H04B 7/0695* (2013.01); *H04B 7/088* (2013.01);
(Continued)

(58) Field of Classification Search
CPC .......... H04B 7/043; H04B 7/06; H04B 7/088; H04B 17/327; H04B 7/0695; H04B 17/15; H04B 17/29; H04B 17/19; H04B 17/0085
See application file for complete search history.

(56) References Cited

U.S. PATENT DOCUMENTS 9,467,871 B2 * 10/2016 Hwang ................ H04B 7/0634
10,270,514 B2 * 4/2019 Moon ................. H04B 7/0695
(Continued)

FOREIGN PATENT DOCUMENTS

CN 102835042 A 12/2012
CN 103503332 A 1/2014
(Continued)

OTHER PUBLICATIONS

ISA/EP, International Search Report and Written Opinion of the International Searching Authority, Int'l Application No. PCT/US2017/052180, dated Nov. 29, 2017, European Patent Office, Rijswijk, NL, 16 pgs.
(Continued)

*Primary Examiner* — Marcos L Torres
(74) *Attorney, Agent, or Firm* — Holland & Hart LLP

(57) ABSTRACT

A wireless communications system may support beamforming to transmit and receive signals. A device operating within the wireless communications system may transmit a request to measure a beamformed reference signal. The device may also transmit a beamforming configuration indicating one or more beamforming options for measuring the beamformed reference signal. The beamforming options may include measuring the beamformed reference signal using a directional configuration and an omni-directional configuration. The device receiving the beamforming configuration may form a receive beam in accordance with the beamforming configuration to measure the beamformed reference signal. A device operating within the wireless communications system may determine to use a particular beamforming option for measuring a beamformed reference signal without first receiving a beamforming configuration, and may make the determination based on signal quality at the device or capabilities of the device.

30 Claims, 13 Drawing Sheets

(51) Int. Cl.
   *H04B 7/08*      (2006.01)
   *H04B 17/327*    (2015.01)
   *H04B 17/15*     (2015.01)
   *H04B 17/29*     (2015.01)
   *H04B 17/00*     (2015.01)

(52) U.S. Cl.
   CPC ............ *H04B 17/15* (2015.01); *H04B 17/29* (2015.01); *H04B 17/327* (2015.01); *H04B 17/0085* (2013.01)

(56) References Cited

U.S. PATENT DOCUMENTS

| | | | |
|---|---|---|---|
| 2011/0116393 A1* | 5/2011 | Hong | H04W 72/04 370/252 |
| 2013/0077523 A1 | 3/2013 | Ko et al. | |
| 2013/0229307 A1* | 9/2013 | Chang | H01Q 1/246 342/372 |
| 2013/0286960 A1* | 10/2013 | Li | H04W 72/042 370/329 |
| 2015/0365939 A1* | 12/2015 | Zhang | H04B 7/0617 370/336 |
| 2016/0043792 A1* | 2/2016 | Jeong | H01Q 3/34 370/328 |
| 2016/0105817 A1 | 4/2016 | Frenne et al. | |
| 2016/0134352 A1 | 5/2016 | Stirling-Gallacher | |
| 2016/0197659 A1* | 7/2016 | Yu | H04J 13/0003 370/335 |
| 2017/0047976 A1* | 2/2017 | Noh | H04B 7/0617 |
| 2017/0063503 A1* | 3/2017 | Liu | H04L 25/03 |
| 2017/0208494 A1* | 7/2017 | Moon | H04B 7/065 |
| 2018/0212800 A1* | 7/2018 | Park | H04L 5/0057 |
| 2018/0219659 A1* | 8/2018 | Wernersson | H04B 7/024 |
| 2020/0045684 A1* | 2/2020 | Futaki | H04W 72/085 |
| 2020/0084653 A1* | 3/2020 | Moon | H04L 5/0048 |

FOREIGN PATENT DOCUMENTS

| | | |
|---|---|---|
| CN | 104396151 A | 3/2015 |
| CN | 104620551 A | 5/2015 |
| CN | 104919715 A | 9/2015 |
| JP | 2015523757 A | 8/2015 |
| JP | 2016046657 A | 4/2016 |
| JP | 2016127345 A | 7/2016 |
| WO | WO-2014124237 A1 | 8/2014 |
| WO | WO-2015172836 A1 | 11/2015 |
| WO | WO2016032104 A1 | 3/2016 |
| WO | WO-2016122852 A1 | 8/2016 |
| WO | WO-2016129418 A1 | 8/2016 |
| WO | WO-2016157727 A1 | 10/2016 |

OTHER PUBLICATIONS

Nokia, et al., "On Beam Training Based on Periodic DL Signals", 3GPP TSG-RAN WG1#86bis, 3GPP Draft; R1-1610244, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 9, 2016 (Oct. 9, 2016), 4 Pages, XP051150263, Retrieved from the Internet: URL: http://www.3gpp.org/ftp/Meetings_3GPP_SYNC/RAN1/Docs/ [retrieved on Oct. 9, 2016].

Huawei, Hisilicon: "Discussion on Beam Management Aspects for DL MIMO" [online], 3GPP Draft, 3GPP TSG RAN WG1 Meeting #86bis, R1-1609414, Lisbon, Portugal, Oct. 10-14, 2016, pp. 1-5, Retrieved from the Internet URL: http://www.3gpp.org/ftp/tsg_ran/WG1_RL1/TSGR1_86b/Docs/R1-1609414.zip.

\* cited by examiner

RECEIVER BEAMFORMING FOR MEASUREMENTS

CROSS REFERENCES

The present Application for Patent claims priority to U.S. Provisional Patent Application No. 62/414,652 by Nagaraja et al., entitled "RECEIVING BEAMFORMING FOR MEASUREMENTS," filed Oct. 28, 2016, assigned to the assignee hereof.

BACKGROUND

The following relates generally to wireless communication, and more specifically to receiver beamforming for measuring reference signals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems.

In some examples, a wireless multiple-access communication system may include a number of base stations, each simultaneously supporting communication for multiple communication devices, otherwise known as user equipment (UEs). In a Long-Term Evolution (LTE) or LTE-Advanced (LTE-A) network, a set of one or more base stations may define an eNodeB (eNB). In other examples (e.g., in a next generation new radio (NR) or 5G network), a wireless multiple-access communication system may include a number of smart radio heads (RHs) in communication with a number of access node controllers (ANCs), where a set of one or more RHs, in communication with an ANC, defines a base station (e.g., an eNB). A base station may communicate with a set of UEs on downlink (DL) channels (e.g., for transmissions from a base station to a UE) and uplink (UL) channels (e.g., for transmissions from a UE to a base station).

In some examples, a wireless network may operate in millimeter wave (mmW) spectrum. Using mmW spectrum may result in additional attenuation, which may impact the link budget of the communications. A base station operating in mmW spectrum may utilize beamforming techniques to increase the strength of wireless signals (e.g., reference signals) in particular directions to address the additional attenuation. However, to receive a beamformed signal from a base station, a UE may blindly sweep in multiple directions, which may result in measurement delays and inefficient use of resources.

SUMMARY

The described techniques generally relate to methods for transmitting and receiving beamformed reference signals. A receiving device, which may be a user equipment (UE) or a base station, may be able to receive beamformed signals from a transmitting device using an omni-directional or directional configuration. Similarly, a transmitting device, which may be UE or a base station, may be able to transmit beamformed signals using an omni-directional or directional configuration. The different receiver beamforming options may be signaled to the receiving device in a configuration message. In some examples, the transmitting device (e.g., a base station) may instruct the receiving device to use a particular receiver beamforming configuration to receive a particular reference signal. Additionally or alternatively, the transmitting device may provide the receiving device with triggers or thresholds, which may be used by the receiving device to determine which receiver beamforming pattern to use under certain conditions. The receiving device may form a receiver beam pattern in accordance with the instructions or may instead overwrite the instructions and use a different receiver beam pattern based on radio conditions at the receiving device or capabilities of the receiving device.

In some examples, a receiving device may decide which receiver beam pattern to use (e.g., omni-directional or directional) without first receiving instructions from a transmitting device. The receiving device may assess the signal quality at the receiving device or the mobility of the receiving device and choose a receiver beam pattern accordingly.

A method of wireless communication is described. The method may include transmitting a request to measure a beamformed reference signal, transmitting a beamforming configuration indicating one or more beamforming options for measuring the beamformed reference signal, the one or more beamforming options including an indication of a beam pattern for measuring the beamformed reference signal using a directional configuration and an omni-directional configuration, and transmitting the beamformed reference signal.

An apparatus for wireless communication is described. The apparatus may include means for transmitting a request to measure a beamformed reference signal, means for transmitting a beamforming configuration indicating one or more beamforming options for measuring the beamformed reference signal, the one or more beamforming options including an indication of a beam pattern for measuring the beamformed reference signal using a directional configuration and an omni-directional configuration, and means for transmitting the beamformed reference signal.

Another apparatus for wireless communication is described. The apparatus may include a processor, memory in electronic communication with the processor, and instructions stored in the memory. The instructions may be operable to cause the processor to transmit a request to measure a beamformed reference signal, transmit a beamforming configuration indicating one or more beamforming options for measuring the beamformed reference signal, the one or more beamforming options including an indication of a beam pattern for measuring the beamformed reference signal using a directional configuration and an omni-directional configuration, and transmit the beamformed reference signal.

A non-transitory computer readable medium for wireless communication is described. The non-transitory computer-readable medium may include instructions operable to cause a processor to transmit a request to measure a beamformed reference signal, transmit a beamforming configuration indicating one or more beamforming options for measuring the beamformed reference signal, the one or more beamforming options including an indication of a beam pattern for measuring the beamformed reference signal using a directional configuration and an omni-directional configuration, and transmit the beamformed reference signal.

Some examples of the method, apparatus, and non-transitory computer-readable medium described above may further include processes, features, means, or instructions for transmitting an indication of whether to use the directional configuration or the omni-directional configuration to measure the beamformed reference signal.

In some examples of the method, apparatus, and non-transitory computer-readable medium described above, the indication indicates use of the omni-directional configuration when a signal quality as measured is at or above a threshold, and indicates use of the directional configuration when the signal quality as measured is below the threshold.

In some examples of the method, apparatus, and non-transitory computer-readable medium described above, the signal quality may be based at least in part on an a reference signal received power (RSRP), a reference signal received quality (RSRQ), a channel quality indicator (CQI), a signal-to-noise ratio (SNR), or a combination thereof.

In some examples of the method, apparatus, and non-transitory computer-readable medium described above, the indication indicates a beam shape to use to measure the beamformed reference signal, wherein the beam shape comprises a beam width, an array gain, a beam direction, or a combination thereof. In some examples of the method, apparatus, and non-transitory computer-readable medium described above, the indication indicates use of the omni-directional configuration when the beamformed reference signal overlaps with a reference signal from a neighboring transmitter. In some examples of the method, apparatus, and non-transitory computer-readable medium described above, the indication indicates use of both the directional configuration and the omni-directional configuration.

In some examples of the method, apparatus, and non-transitory computer-readable medium described above, the indication comprises a beam sweep pattern that comprises a repeated reference signal in a plurality of symbols to indicate use of the omni-directional configuration.

Some examples of the method, apparatus, and non-transitory computer-readable medium described above may further include processes, features, means, or instructions for determining that a frequency of beam switches is at or above a threshold, wherein the indication indicates use of the omni-directional configuration.

Some examples of the method, apparatus, and non-transitory computer-readable medium described above may further include processes, features, means, or instructions for transmitting an activation message to activate or deactivate the one or more beamforming options.

In some examples of the method, apparatus, and non-transitory computer-readable medium described above, the beamformed reference signal comprises a mobility reference signal (MRS), a channel state information reference signal (CSI-RS), a new radio synchronization (SYNC) signal such as a primary SYNC signal (PSS), a secondary SYNC signal (SSS), a demodulation reference signal (DMRS), or a combination thereof.

A method of wireless communication is described. The method may include receiving a request to measure a beamformed reference signal, receiving a beamforming configuration indicating one or more beamforming options for measuring the beamformed reference signal, wherein the one or more beamforming options includes measuring the beamformed reference signal using a directional configuration and an omni-directional configuration, determining to use the directional configuration or the omni-directional configuration based at least in part on the beamforming configuration, and measuring the beamformed reference signal based at least in part on the determination.

An apparatus for wireless communication is described. The apparatus may include means for receiving a request to measure a beamformed reference signal, means for receiving a beamforming configuration indicating one or more beamforming options for measuring the beamformed reference signal, wherein the one or more beamforming options includes measuring the beamformed reference signal using a directional configuration and an omni-directional configuration, means for determining to use the directional configuration or the omni-directional configuration based at least in part on the beamforming configuration, and means for measuring the beamformed reference signal based at least in part on the determination.

Another apparatus for wireless communication is described. The apparatus may include a processor, memory in electronic communication with the processor, and instructions stored in the memory. The instructions may be operable to cause the processor to receive a request to measure a beamformed reference signal, receive a beamforming configuration indicating one or more beamforming options for measuring the beamformed reference signal, wherein the one or more beamforming options includes measuring the beamformed reference signal using a directional configuration and an omni-directional configuration, determine to use the directional configuration or the omni-directional configuration based at least in part on the beamforming configuration, and measure the beamformed reference signal based at least in part on the determination.

A non-transitory computer readable medium for wireless communication is described. The non-transitory computer-readable medium may include instructions operable to cause a processor to receive a request to measure a beamformed reference signal, receive a beamforming configuration indicating one or more beamforming options for measuring the beamformed reference signal, wherein the one or more beamforming options includes measuring the beamformed reference signal using a directional configuration and an omni-directional configuration, determine to use the directional configuration or the omni-directional configuration based at least in part on the beamforming configuration, and measure the beamformed reference signal based at least in part on the determination.

Some examples of the method, apparatus, and non-transitory computer-readable medium described above may further include processes, features, means, or instructions for receiving an indication of whether to use the directional configuration or the omni-directional configuration to measure the beamformed reference signal.

Some examples of the method, apparatus, and non-transitory computer-readable medium described above may further include processes, features, means, or instructions for determining to use the directional configuration if the indication indicates use of the omni-directional configuration or determining to use the directional configuration if the indication indicates use of the omni-directional configuration.

Some examples of the method, apparatus, and non-transitory computer-readable medium described above may further include processes, features, means, or instructions for transmitting a message indicating whether the directional configuration or the omni-directional configuration was used to measure the beamformed reference signal.

Some examples of the method, apparatus, and non-transitory computer-readable medium described above may further include processes, features, means, or instructions for transmitting a configuration request requesting a reference signal beam sweep type that may be compatible with the omni-directional configuration.

A method of wireless communication is described. The method may include receiving a request to measure a beamformed reference signal, determining a signal quality, determining to use a directional configuration or an omni-directional configuration to measure the beamformed reference signal based at least in part on the signal quality, and measuring the beamformed reference signal based at least in part on the determination.

An apparatus for wireless communication is described. The apparatus may include means for receiving a request to measure a beamformed reference signal, means for determining a signal quality, means for determining to use a directional configuration or an omni-directional configuration to measure the beamformed reference signal based at least in part on the signal quality, and means for measuring the beamformed reference signal based at least in part on the determination.

Another apparatus for wireless communication is described. The apparatus may include a processor, memory in electronic communication with the processor, and instructions stored in the memory. The instructions may be operable to cause the processor to receive a request to measure a beamformed reference signal, determine a signal quality, determine to use a directional configuration or an omni-directional configuration to measure the beamformed reference signal based at least in part on the signal quality, and measure the beamformed reference signal based at least in part on the determination.

A non-transitory computer readable medium for wireless communication is described. The non-transitory computer-readable medium may include instructions operable to cause a processor to receive a request to measure a beamformed reference signal, determine a signal quality, determine to use a directional configuration or an omni-directional configuration to measure the beamformed reference signal based at least in part on the signal quality, and measure the beamformed reference signal based at least in part on the determination.

Some examples of the method, apparatus, and non-transitory computer-readable medium described above may further include processes, features, means, or instructions for determining to use the omni-directional configuration if the signal quality may be at or above a threshold. Some examples of the method, apparatus, and non-transitory computer-readable medium described above may further include processes, features, means, or instructions for determining to use the directional configuration if the signal quality is below the threshold.

In some examples of the method, apparatus, and non-transitory computer-readable medium described above, the signal quality may be based at least in part on an RSRP, an RSRQ, a CQI, an SNR, or a combination thereof.

Some examples of the method, apparatus, and non-transitory computer-readable medium described above may further include processes, features, means, or instructions for transmitting a message indicating whether the directional configuration or the omni-directional configuration was used to measure the beamformed reference signal.

DETAILED DESCRIPTION

A wireless communications system may be configured to operate using millimeter wave (mmW) spectrum and devices within the system may send and receive directional beamformed signals. For example, a base station may use hybrid beamforming to create a narrow beam pattern to transmit data or control information to a user equipment (UE). A base station may monitor the conditions of active beams by sending reference signals (e.g., mobility reference signals (MRS)) to a UE, and requesting that the UE measure the reference signals and provide feedback. However, if the UE is unaware of the direction from which the reference signal is being sent, the UE may blindly sweep in multiple directions to find the reference signal, which may cause measurement latency and inefficient use of resources.

In accordance with aspects of the present disclosure, the base station may convey a configuration or instructions to assist the UE in determining how to configure a receiver beam to receive and measure reference signals sent from a base station. For example, a base station may instruct a UE to use an omni-directional or a directional beamforming configuration to measure the reference signals. Additionally or alternatively, the base station may provide triggers or thresholds for the UE to use to determine which receiver beam configuration to use under certain conditions. In some examples, a UE may determine which receiver beam configuration to use without first receiving instructions from a base station. For example, a UE may determine to use an omni-directional or directional beamforming configuration for measuring a reference signal based on conditions at the UE or capabilities of the UE.

The techniques of conveying configuration information, triggers, or thresholds to assist a UE in forming a receiver beam pattern may also be applied to uplink (UL) transmissions of reference signals from a UE to a base station. For example, a base station may configure or instruct a UE to use a particular transmit beam pattern (e.g., omni-directional or directional) to transmit a reference signal to a base station. In some examples, the UE may determine which transmit beam pattern to use based on conditions at the UE or capabilities of the UE.

Aspects of the disclosure are initially described in the context of several wireless communications systems. Aspects of the disclosure are further illustrated by and described with reference to apparatus diagrams, system diagrams, and flowcharts that relate to receiver beamforming for measurements.

Figure 1:
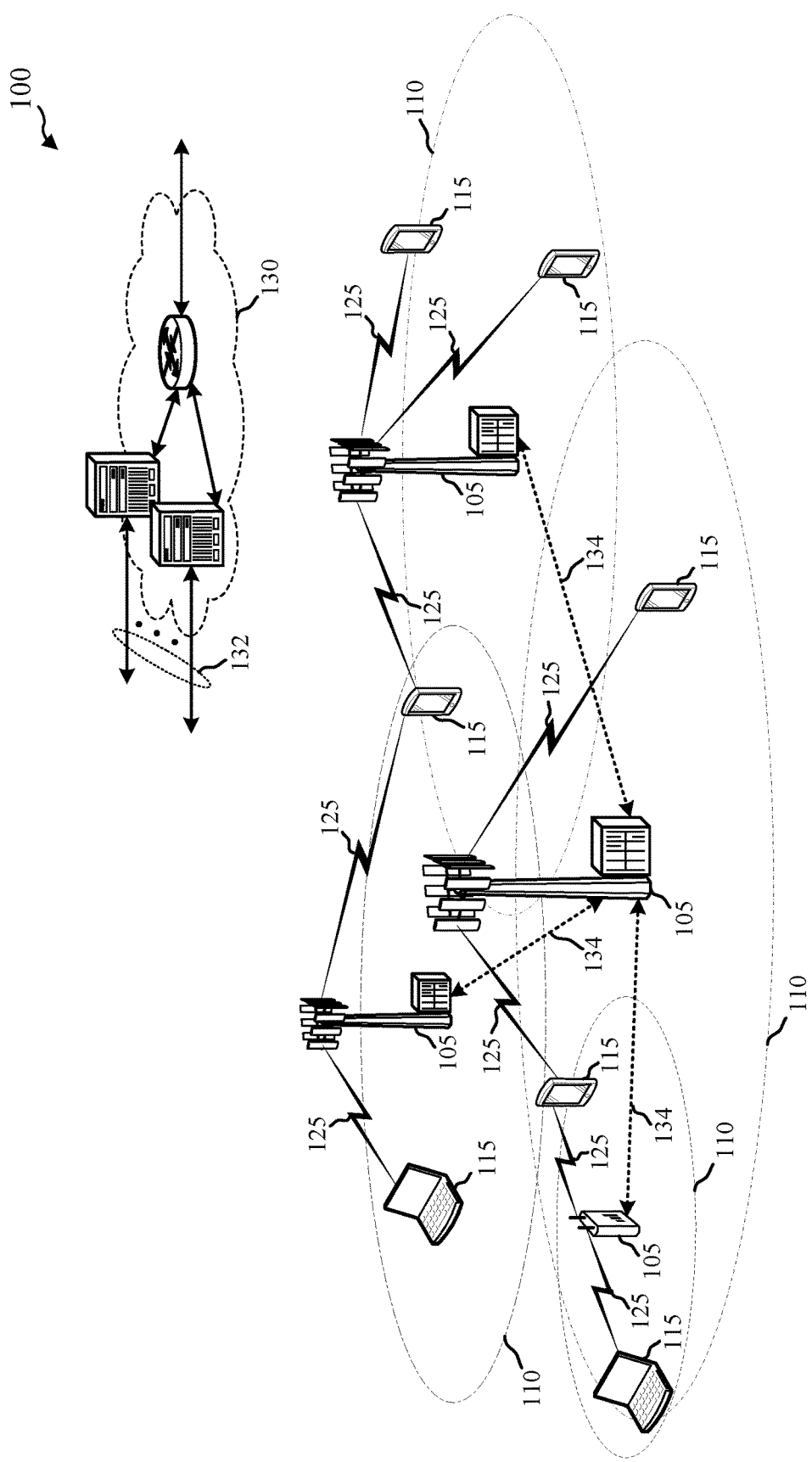
FIG. 1 illustrates an example of a system for wireless communication that supports receiver beamforming for measurements in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices. The wireless communications system 100 may support communication using beamformed signals, and the devices (e.g., UEs 115 or base stations 105) may employ techniques to configure receiver beam patterns to efficiently receive and measure reference signals.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or downlink (DL) transmissions, from a base station 105 to a UE 115. Control information and data may be multiplexed on an uplink channel or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one packet-data network gateway (P-GW). The MME may be the control node that processes the signaling between the UE 115 and the EPC. All user internet protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band (e.g., mmW spectrum), since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

The wireless communications system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Directional communications may be referred to as beams or beamformed signals. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). In some cases, beamforming may combine analog and digital techniques, and may be referred to as hybrid beamforming. Hybrid beamforming may support narrow beam patterns, thus optimizing the link budget or signal-noise-ratio (SNR) in a wireless system. This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station) and a receiver (e.g., a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving signals from a transmitter, such as reference or synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, a directional beam used for beamformed communications may be referred to as an active beam or a serving beam. An active beam may be a base station and a UE beam pair carrying control channels and data channels such as physical downlink shared channel (PDSCH), physical downlink control channel (PDCCH), physical uplink shared channel (PUSCH), and physical uplink control channel (PUCCH). In some cases an active beam may be changed or refined based on channel conditions to increase the quality of the link. In addition to refining active beams, candidate beams (e.g., alternative beams to the currently active beam) may be measured to determine if a beam switch would increase the quality of the link.

A device within the wireless communications system 100 (e.g., a base station 105) may monitor active or candidate beams using beam measurements and feedback. For example, a base station 105 may request that a particular UE 115 provide measurement feedback of a reference signal (e.g., an MRS, a channel state information reference signal (CSI-RS), or a synchronization signal (SYNC)) by sending a measurement request to the UE 115. The UE 115 may then measure the reference signal and provide feedback for the base station 105 to use in beam selection or refinement. This process may also be reversed, such that a UE 115 sends a reference signal to a base station 105, and the base station 105 provides feedback information to the UE 115. In either case, when using beamformed communications, a device receiving a reference signal may be unaware of the direction from which the reference signal is being sent. Without an indication of how to form a receiver beam to measure the reference signal, a receiving device may choose to use a receiver beam pattern that incurs measurement latency or otherwise inefficiently uses resources.

In accordance with aspects of the disclosure, a base station 105 may transmit a request to a UE 115 to measure a beamformed reference signal. The base station 105 may also transmit a beamforming configuration that indicates one or more beamforming options for the UE 115 to use for receiving and measuring the reference signal. The beamforming options may include using an omni-directional configuration to receive the reference signal or using a directional configuration to receive the reference signal. In some examples, the base station 105 may explicitly indicate which receiver beam pattern to use to measure the reference signal.

Additionally or alternatively, a base station 105 may indicate certain triggers for the UE 115 to use to determine which receiver beam pattern to employ. The UE 115 may form a receiver beam pattern in accordance with the indications sent from the base station 105, or may instead choose to use a different beam pattern based on conditions at the UE 115 or certain capabilities of the UE 115. By signaling to the UE 115 which beam pattern to use under certain conditions to measure a reference signal from the base station 105, the base station 105 may assist the UE 115 in choosing a receiver beam pattern that reduces measurement latency or otherwise increases the efficiency of resource use within the wireless communications system 100.

Figure 2:
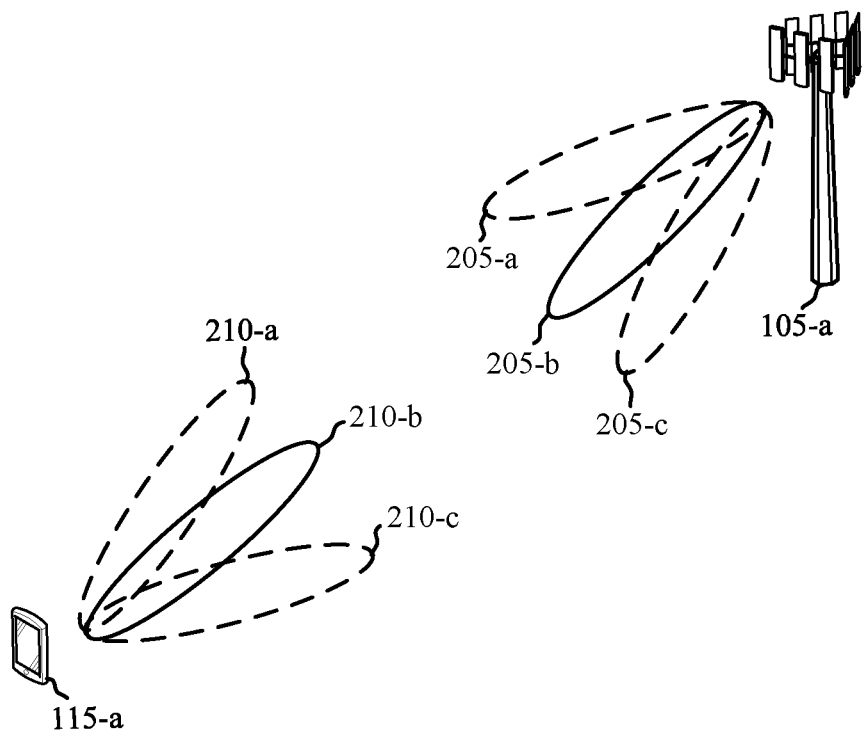
FIG. 2 illustrates an example of a system for wireless communication that supports receiver beamforming for measurements in accordance with aspects of the present disclosure.

FIG. 2 illustrates an example of a wireless communication system 200 that supports beamforming for measurements in accordance with aspects of the present disclosure. The wireless communication 200 may include a UE 115-*a* and a base station 105-*a*, which may be examples of the UE 115 and base station 105 described with reference to FIG. 1. The UE 115-*a* and base station 105-*a* may communicate using beams (e.g., directional communications) and may operate using mmW spectrum, for example. The wireless communication system 200 illustrates aspects of conveying beamforming options between base station 105-*a* and UE 115-*a* for reference signal measurement or transmission.

As discussed above, when operating in mmW spectrum, wireless devices may employ signal processing techniques such as beamforming to coherently combine energy and overcome path losses. In some cases, base station 105-*a* may use one or more beams 205 for transmission and/or reception. Beams 205 may be transmitted in a shaped or directional manner, where each beam 205 is transmitted in a different direction or in a sweeping pattern. For example, beam 205-*a* may be transmitted in a first direction or shape, beam 205-*b* may be transmitted in a second direction or shape, and beam 205-*c* may be transmitted in a third direction or shape. Furthermore, the UE 115-*a* may use one or more directional beams 210 for transmission and/or reception.

The base station 105-*a* may select a particular beam 205 (e.g., 205-*b*) to communicate data or control information with UE 115-*a*. Likewise, the UE 115-*a* may select a particular beam 210 (e.g., 210-*b*) to communicate data or control information with base station 105-*a*. A pair of beams used for communication (e.g., beams 205-*b* and 210-*b*) may be referred to as an active beam. Also, the beam pattern used for transmitting data may be referred to as a transmitter beam pattern and the beam pattern used for receiving data may be referred to as a receiver beam pattern.

In some cases, the base station 105-*a* may monitor beams to assess the quality of the currently active beam or to assess other candidate beams. To monitor an active beam, the base station 105-*a* may requests measurements or feedback from the UE 115-*a*. For example, the base station 105-*a* may monitor active beams using measurements of signals such as a MRS, CSI-RS, or SYNC signals. To receive feedback from a reference signal, the base station 105-*a* may first send a measurement request to the UE 115-*a*. Upon receiving the measurement request, the UE 115-*a* may form a directional receiver beam pattern or may begin sweeping to locate the reference signal.

To assist the UE 115-*a* in forming a receiver beam pattern to measure the reference signal, the base station 105-*a* may convey one or more receiving beamforming options that the UE 115-*a* may use for measuring reference signals associated with the beams 205 from the base station 105-*a*, or a neighboring base station 105 (not shown). The beamforming options may include receiving and measuring reference signals using an omni-directional configuration or a directional configuration. A directional beam pattern may refer to a configuration where the UE 115-*a* selects a particular beam direction or some other specific beam parameters to transmit or receive a reference signal (e.g., selecting beam 210-*b* instead of beam 210-*a* and beam 210-*c*). An omni-directional beam pattern may refer to a configuration where the UE 115-*a* uses all directions (either simultaneously or through a sweeping pattern) to transmit or receive a reference signal. The base station 105-*a* may also convey one or more transmission beamforming options (e.g., directional or omni-directional) that the UE 115-*a* may use for forming a transmit beam pattern for transmitting a reference signal to the base station 105-*a*.

In some examples, the base station 105-*a* may convey the beamforming options in a configuration message, and the message may be transmitted as part of a control message (e.g., Layer 1/Layer 2/Layer 3 control message). The configuration message may be sent to the UE 115-*a* during the initial call setup (e.g., using RRC signaling), or may be broadcast to the UE 115-*a* via system information, or may be otherwise conveyed to the UE 115-*a*. Furthermore, the beamforming options may be activated or deactivated over time by the base station 105-*a* through the control messaging.

In some examples, the base station 105-*a* may coordinate overlapping transmissions of reference signals between the base station 105-*a* and neighboring base stations 105 (e.g., as shown in FIG. 1). For example, the base station 105-*a* may instruct the UE 115-*a* to use a particular beamforming configuration for measuring reference signals from the base station 105-*a* (e.g., from the source base station 105-*a*), and may also instruct the UE 115-*a* to use the same or different beamforming configurations for measuring reference signals from neighboring base stations 105. In some examples, the base station 105-*a* may indicate to the UE 115-*a* to use a specific beamforming pattern for reception or transmission of reference signals for a specific cell or set of neighboring cells (e.g., a serving cell).

In some examples, the base station 105-*a* may instruct the UE 115-*a* to use a specific receive or transmit beam pattern for measuring or transmitting a reference signal (e.g., instruct the UE 115-*a* to select beam 210-*b*). The base station 105-*a* may send the instructions or otherwise indicate the selection to the UE 115-*a* either along with the configuration message or as a separate message (e.g., through an activation message). In some cases, the base station 105-*a* may provide specific beamforming parameters for the UE 115-*a* to use to form a receiving or transmission beam pattern for measuring or transmitting reference signals. For example, the base station 105-*a* may specify a beam shape, which may include a width, an array gain, a beam direction, or a combination of these parameters for the UE 115-*a* to use. In some examples, the parameters of the beams 210 (e.g., beam 210-*b*) may be specified as a preferred receive direction corresponding to a particular direction of a transmission beam 205 (e.g., beam 205-*b*), among the directions in which a specified reference signal (e.g., a SYNC signal) is beam-swept. In some examples, the base station 105-*a* may configure or indicate to the UE 115-*a* a choice of beamforming pattern for receiving or transmitting one or more reference signals and at one or more symbols.

In some examples, the base station 105-*a* may provide conditional parameters (e.g., triggers or thresholds) for the UE 115-*a* to use when selecting a receive or transmit beam pattern. Triggers and thresholds may also be employed at the base station 105-*a* to determine when a message should be sent to the UE 115-*a* indicating which receiver or transmit beam pattern to use for a particular reference signal. For example, the base station 105-*a* may indicate to the UE 115-*a* to use a directional beam for measurement if the signal quality (or some other measure of channel quality) at the UE 115-*a* is below a threshold and to use an omni-directional configuration if the signal quality at the UE 115-*a* is at or above the threshold. The signal quality may be based on a reference signal received power (RSRP), a reference signal received quality (RSRQ), a channel quality indicator (CQI), a signal-to-noise ratio (SNR), or a combination thereof. For instance, the base station 105-*a* may indicate to the UE 115-*a* to use a directional beam for measurement if the signal quality at the UE 115-*a* measured while using an omni-directional configuration or a directional configuration is below a threshold. In other cases, the base station 105-*a* may indicate to the UE 115-*a* to use an omni-directional beam for measurement if the signal quality at the UE 115-*a* measured while using an omni-directional configuration or a directional configuration is at or above a threshold. In some cases, the base station 105-*a* may indicate to the UE 115-*a* to use a combination of omni-directional and directional beams for measurement.

In some examples, the base station 105-*a* may use UL measurements (e.g., sounding reference signal (SRS) or random access channel (RACH) preamble) as a trigger to instruct the UE 115-*a* to use a particular beam pattern (e.g., omni-directional or directional) for receiving or transmitting a reference signal. Furthermore, the base station 105-*a* may also use prior measurement reports of signals such as beam reference signal (BRS), MRS, or CSI-RS as an indication trigger for the UE 115-*a* to use a particular beamforming option.

In some examples, the base station 105-*a* may use the frequency of beam switches between the base station 105-*a* and the UE 115-*a* as a trigger to indicate a particular beam pattern to the UE 115-*a*. For example, the base station may determine that the frequency of beam switches for the UE 115-*a* exceeds a threshold (e.g., when the UE 115-*a* is in motion), and may subsequently configure the UE 115-*a* to use an omni-directional configuration. The base station 105-*a* may also use any other indication that the UE 115-*a* is moving to trigger the UE 115-*a* to use an omni-directional configuration.

In some examples, the choice of beam sweep pattern used by the base station 105-*a* may serve as a trigger for the base station 105-*a* to indicate a particular receiver beam pattern. For example, the base station 105-*a* may know that it is sending a different beam in each symbol (e.g., in each OFDM symbol). This pattern may trigger the base station 105-*a* to configure or otherwise instruct the UE 115-*a* to use an omni-directional configuration.

After receiving a beamforming configuration or beamforming instructions from the base station 105-*a*, the UE 115-*a* may decide whether or not to form its receive or transmit beam pattern accordingly. The decision of whether to comply with the base station 105-*a* may be based on for example, radiofrequency (RF) conditions at the time or the capabilities of the UE 115-*a*. For example, the base station 105-*a* may indicate to the UE 115-*a* to use an omni-directional configuration for measurements, but the radio conditions at the UE 115-*a* may be poor such that the UE 115-*a* decides to use an alternate measurement mode (e.g., directional beams). In another example, even if the base station 105-*a* configures or instructs the UE 115-*a* to use directional beamforming, the UE 115-*a* may lack the capability to comply, and may instead choose to use omni-directional beamforming. In some examples, the UE 115-*a* may explicitly indicate its choice of beamforming pattern to the base station 105-*a*. Furthermore, in some cases, the UE 115-*a* may use the beam state measurements to trigger an event, such as indicating a neighbor cell exceeds the current cell by an offset (e.g., LTE Event A3).

In some examples, the UE 115-*a* may explicitly request a particular reference signal transmission type (e.g., a specific MRS beam sweep type) that is more suited for a particular receiver beamforming configuration (e.g., omni-directional) to reduce latency. For example, the base station 105-*a* and a second base station 105 may transmit a MRS on the same symbol, which may be measured by an omni-directional beam.

In some examples, the UE 115-*a* may not receive a beamforming configuration from the base station 105-*a*. In that case, the UE 115-*a* may decide on a feasible option for measurements reporting based on one or more metrics (e.g., quality of signal). For example, the UE 115-*a* may use a directional beam for measurements if the signal quality is below a threshold, and an omni-directional beam if the signal quality is at or above the threshold. Similar to as described above, the UE 115-*a* may decide to use a directional beam for measurement if the signal quality at the UE 115-*a* measured while using an omni-directional configuration or a directional configuration is below a threshold. In other cases, the UE 115-*a* may decide to use an omni-directional beam for measurement if the signal quality at the UE 115-*a* measured while using an omni-directional configuration or a directional configuration is at or above a threshold. Furthermore, on occasion, the UE 115-*a* may decide to use both omni-directional and directional beams for measurements reporting. In some cases, the UE 115-*a* may indicate the choice of UE beamformed signals 205 in its measurement reports.

In some other cases, the beam option used by the UE 115-*a* may be based on a previous indication by the base station 105-*a*. For example, if the base station 105-*a* had previously indicated the UE 115-*a* to use omni-directional beams (e.g., to measure and report a plurality of beams 205 from a plurality of base stations 105, or if the UE 115-*a* is mobile, or due to frequent beam switches) the UE 115-*a* may use an omni-directional beam.

Furthermore, as described throughout the examples above, the described beamforming techniques (and the techniques for configuring, indicating, and triggering the different beamforming options) may also be employed to form transmit beam patterns for transmission of UL reference signals from the UE 115-*a* to the base station 105-*a*.

Figure 3A:
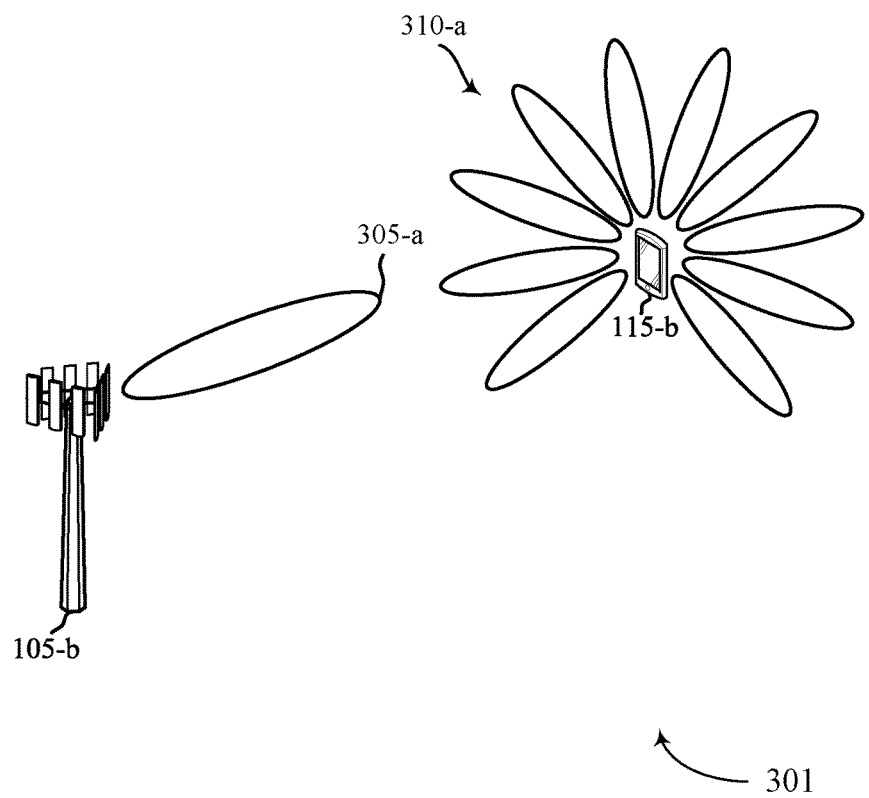
FIGS. 3A-3B illustrate examples of systems for wireless communication that support receiver beamforming for measurements in accordance with aspects of the present disclosure.

FIG. 3A illustrates an example of a wireless communications system 301 that supports beamforming for measurements in in accordance with aspects of the present disclosure. The wireless communication 301 may include a UE 115-*b* and a base station 105-*b*, which may be examples of the UE 115 and base station 105 described with reference to FIG. 1 and FIG. 2. The UE 115-*b* and base station 105-*b* may communicate using beams and may operate using mmW spectrum, for example. For example, the base station 105-*b* may transmit or receive signals (e.g., reference signals) using a directional beam 305-*a*. In this example, the UE 115-*b* may use an omni-directional beam pattern 310-*a* for transmission or reception or reference signals with the base station 105-*b*.

In the wireless communication system 301, the base station 105-*b* may indicate to the UE 115-*a* to use an omni-directional configuration for measuring reference signals associated with the beam 305-*a* if the signal quality is at or above a threshold. The signal quality may be based on a RSRP, RSRQ, CQI, SNR, or a combination thereof. The omni-directional beamforming option may include receiving and measuring the reference signals associated with the beam 305-*a* using an omni-directional beam pattern 310-*a* (e.g., using all directions either simultaneously or through a sweeping pattern). In some cases, the base station 105-*b* may convey the omni-directional beamforming option in a configuration message, which may be transmitted as part of a control message (e.g., Layer 1/Layer 2/Layer 3 control message).

In some examples, the choice of beam sweep pattern used by the base station 105-*b* may serve as a trigger to indicate a particular receiver beam pattern at the UE 115-*b*. For example, the base station 105-*b* may know that it is sending a different beam in each symbol (e.g., in each OFDM symbol). This pattern may trigger the base station 105-*b* to configure or otherwise instruct the UE 115-*b* to use the omni-directional beam pattern 310-*a* for receiving a reference signal. In some other cases, the base station 105-*b* may determine that the frequency of beam switches for the UE 115-*b* exceeds a threshold (e.g., when the UE 115-*b* is in motion), and may subsequently configure the UE 115-*b* to use omni-directional beam pattern 310-*a*.

On reception of a beamforming configuration from base station 105-*b*, the UE 115-*b* may have autonomy in deciding whether or not to report measurements on the configuration, based on for example, RF conditions at the time or capabilities of the UE 115-*b*. For example, in some cases, the UE 115-*b* may determine it is mobile and explicitly request measurements for a reference signal (e.g., MRS) more suited for omni-directional mode to reduce latency. In one example, the first base station 105-*b* and a second base station 105 may transmit MRS on the same symbol, that may be measured by the omni-directional beam 305.

In some examples, the UE 115-*a* may not receive a beamforming configuration or may otherwise not be instructed by the base station 105-*b* to use a particular beamforming pattern for reference signal measurement. In that case, the UE 115-*b* may decide which beamforming option to use for measurement reporting based on one or more metrics (e.g., quality of signal). For example, the UE 115-*b* may use a directional beam for measurements if the signal quality is below a threshold, and the omni-directional beam pattern 310-*a* if the signal quality is at or above the threshold.

In some other cases, the beam option used by the UE 115-*b* may be based on a previous indication by the base station 105-*b*. For example, if the base station 105-*b* had previously indicated the UE 115-*b* to use the omni-directional beam pattern 310-*a*, the UE 115-*b* may use the omni-directional beam pattern 310-*a* for subsequent reference signal measurements. In some cases, the UE 115-*b* may indicate to the base station 105-*b* the chosen reference measurement mode, in addition to the measurements.

Furthermore, in some cases, the above described beamforming techniques may also be deployed in the context of forming an UL beam pattern for transmitting a reference signal from the UE 115-*b*. For example, the UE 115-*b* may use the omni-directional beam pattern 310-*a* to transmit UL reference signals if configured or instructed by the base station 105-*b*. In some examples, the UE 115-*b* may autonomously decide to use the omni-directional beam pattern 310-*a* for UL transmissions based on signal quality at the UE 115-*b* or capabilities of the UE 115-*b*.

Figure 3B:
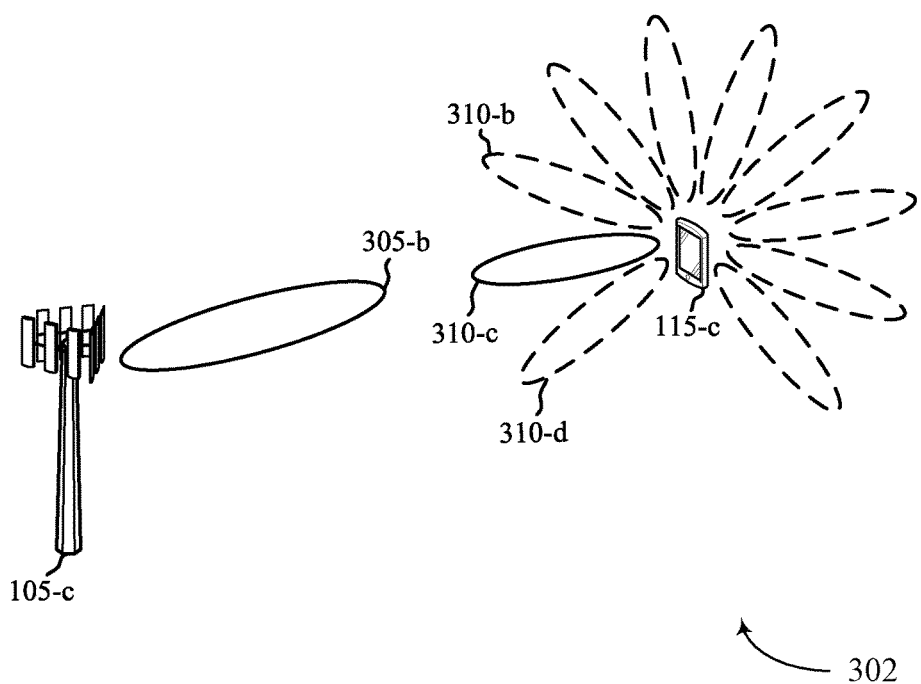

FIG. 3B illustrates an example of a wireless communications system 302 that supports beamforming for measurements in in accordance with aspects of the present disclosure. The wireless communications system 302 may include a UE 115-*c* and a base station 105-*c*, which may be examples of the UE 115 and base station 105 described with reference to FIG. 1, FIG. 2, or FIG. 3A. The UE 115-*c* and base station 105-*c* may communicate using beamformed communications, and may operate using mmW spectrum, for example. For example, the base station 105-*c* may convey a reference signal to the UE 115-c using beam 305-*b*. In this example, the UE 115-*c* may use a directional beam pattern (e.g., select beam 310-*c*) for transmission or reception or reference signals with the base station 105-*b*.

The base station 105-*c* may indicate to the UE 115-*c* to use a directional beamforming option for measuring reference signals if the signal quality (e.g., RSRP, RSRQ, CQI, SNR, etc.) at the UE 115-*c* is below a threshold. In some cases, the base station 105-*c* may convey the directional beamforming option in a configuration message, and the message may be transmitted as part of a control message (e.g., Layer 1/Layer 2/Layer 3 control message). In some other cases, the base station 105-*c* may use these control messages to activate or update the beamforming option.

In one aspect, the base station 105-*c* may provide specific directional beamforming parameters for the UE 115-*c* to use to form its directional receiver beam pattern. For example, the base station 105-*c* may specify a beam shape, which may include a width, an array gain, a beam direction, or a combination of these parameters for the UE 115-*c* to use to form receiver beam 310-*c*. In one example, the parameters of the directional beam pattern may be specified as a preferred receive direction corresponding to a particular direction of the transmit beam 305-*b*, among the directions in which a specified reference signal (e.g., a SYNC signal) is beam-swept. In some cases, beam 310-*c* is aligned with or paired with the beam 305-*b*.

Furthermore, in some cases, the above described beamforming techniques may also be deployed in the context of forming an UL beam pattern for transmitting a reference signal from the UE 115-*c*. For example, the UE 115-*c* may use the directional beam pattern (e.g., select beam 310-*c*) to transmit UL reference signals if configured or instructed by the base station 105-*c*. In some examples, the UE 115-*c* may autonomously decide to use the directional beam pattern for UL transmissions based on signal quality at the UE 115-*c* or capabilities of the UE 115-*c*.

Figure 4:
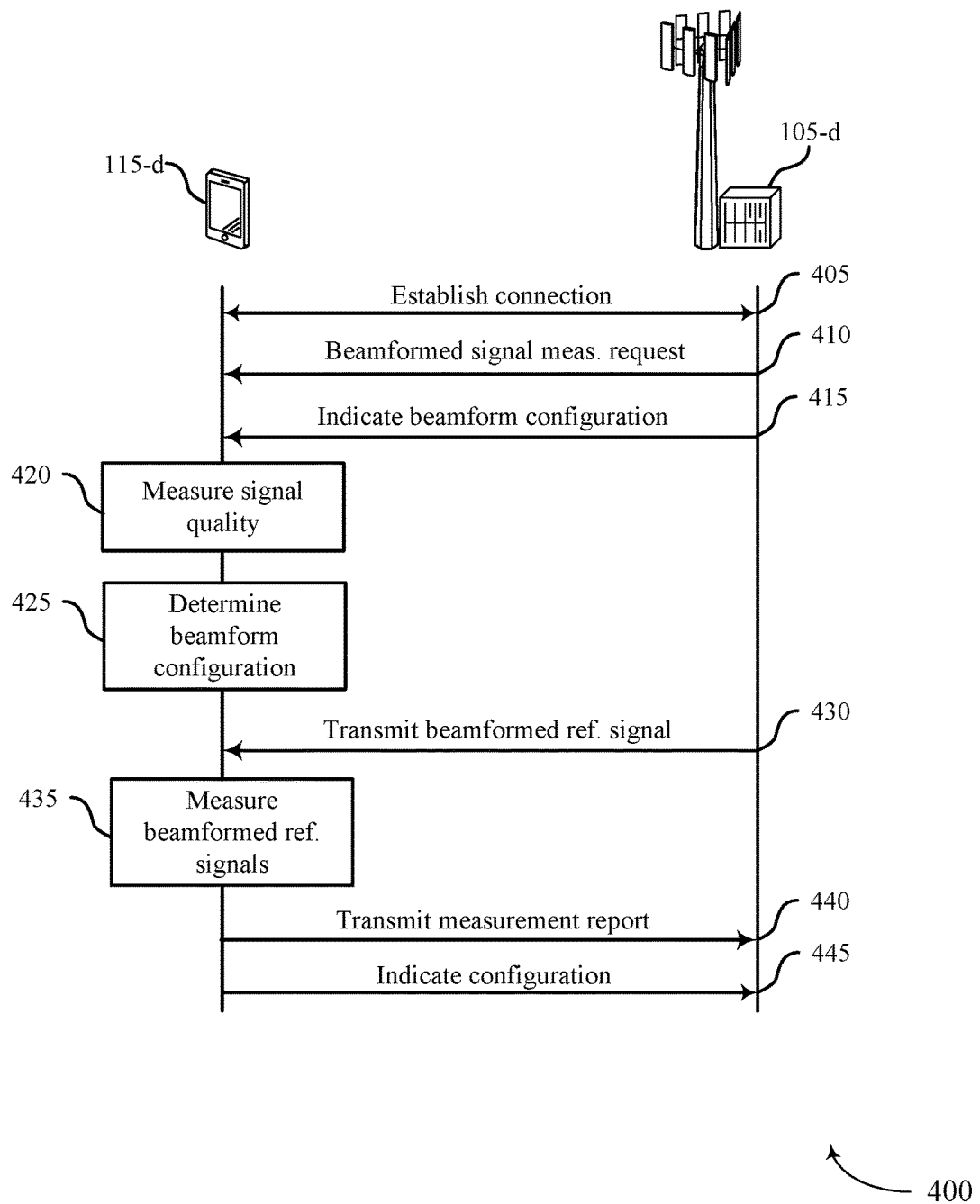
FIG. 4 illustrates an example of a process flow that supports receiver beamforming for measurements in accordance with aspects of the present disclosure.

FIG. 4 illustrates an example of a process flow 400 for receiver beamforming for measurements in accordance with aspects of the present disclosure. The process illustrated by process flow 400 may be implemented by a UE 115-*d* and a base station 105-*d*, which may be examples of a UE 115 and base station described with reference to FIGS. 1-3. In some examples, the process illustrated by flow diagram 400 may be implemented in a wireless system employing mmW communications.

At step 405, a connection may be established between UE 115-*d* and base station 105-*d*. Establishing the connection may including performing random access procedures and/or transmitting RRC signaling. The base station 105-*d* or the UE 115-*d* may determine a signal quality of the connection. In some cases, the signal quality may be based on a RSRP, a RSRQ, a CQI, a SNR, or a combination thereof.

At step 410, the base station 105-*d* may transmit a request to the UE 115-*d* to measure one or more beamformed reference signals. The beamformed reference signals may include a MRS, a CSI-RS, a SYNC signal such as a NR-SS, a PSS, a SSS, a DMRS, or a combination thereof.

At step 415, the base station 105-*d* may indicate to the UE 115-*d* one or more beamforming options (e.g., omni-directional or directional) for the UE 115-*d* to use for measuring the beamformed reference signal(s) of step 410. In some cases, the beamforming options may be sent in a configuration message.

As discussed with reference to FIGS. 2 and 3, the base station 105-*d* may instruct the UE 115-*d* to use a particular receiver beamforming pattern for reference signal measurement, and the instructions may be sent through the configuration message or through a separate message. The beamforming configuration may be based on the signal quality at the UE 115-*d*. For example, the base station 105-*d* may indicate the UE 115-*d* to use an omni-directional configuration when the signal quality is at or above a threshold, and a directional configuration when the signal quality is below the threshold.

In some examples, the beamformed reference signal of base station 105-*d* may overlap with the beamformed reference signal of another nearby base station 105, or the base station 105-*d* may determine UE 115-*d* is mobile. Base station 105-*d* may then indicate to the UE 115-*d* to use an omni-directional configuration.

In some cases of directional configuration, the base station 105-*d* may further indicate a beam shape comprising a beam width, an array gain, a beam direction, or a combination thereof, to the UE 115-*d* to use to measure the beamformed reference signal.

Furthermore, in some cases, the base station 105-*d* may indicate the UE 115-*d* to use both directional and omni-directional configurations for receiving and measuring beamformed reference signals. In some other cases, the base station 105-*d* may transmit a message to the UE 115-*d* to activate or deactivate one or more of the beamforming options At step 420, the UE 115-*d* may measure and determine its receive signal quality. In some cases, the signal quality may be based on a RSRP, a RSRQ, a CQI, a SNR, or a combination thereof. As described with reference to step 405, the signal quality may be measured at other times during the process flow, such as during connection establishment. Also, as described with reference to FIGS. 2-3, the step of measuring signal quality (or other characteristics of the UE 115-*d* such as beam switch frequency) may trigger the base station 105-*d* to send a message indicating which receiver beamforming pattern to use for reference signal measurement.

At step 425, the UE 115-*d* may determine a beamforming configuration for measuring and receiving beamformed reference signals from the base station 105-*d*, based at least in part on the beamforming configuration received at step 420 and/or signal quality measured at step 425.

At step 430, the base station 105-d may transmit the beamformed reference signal to the UE 115-d.

At step 435, the UE 115-d may measure the beamformed reference signals, based at least in part on the beamforming receiver configuration determined at step 425.

At step 440, the UE 115-d may transmit a measurement report to the base station 105-d based on the received reference signal. At step 445, the UE 115-d may indicate to the base station 105-d the beamforming configuration used for receiving and measuring the beamformed signals.

In some examples, the determined beam configuration may also be used for UL transmissions of reference signals from the UE 115-d. For example, at step 415, the base station 105-d may send an indication of which transmit beam pattern (e.g., omni-directional or directional) to use for UL reference signal transmissions.

Figure 5:
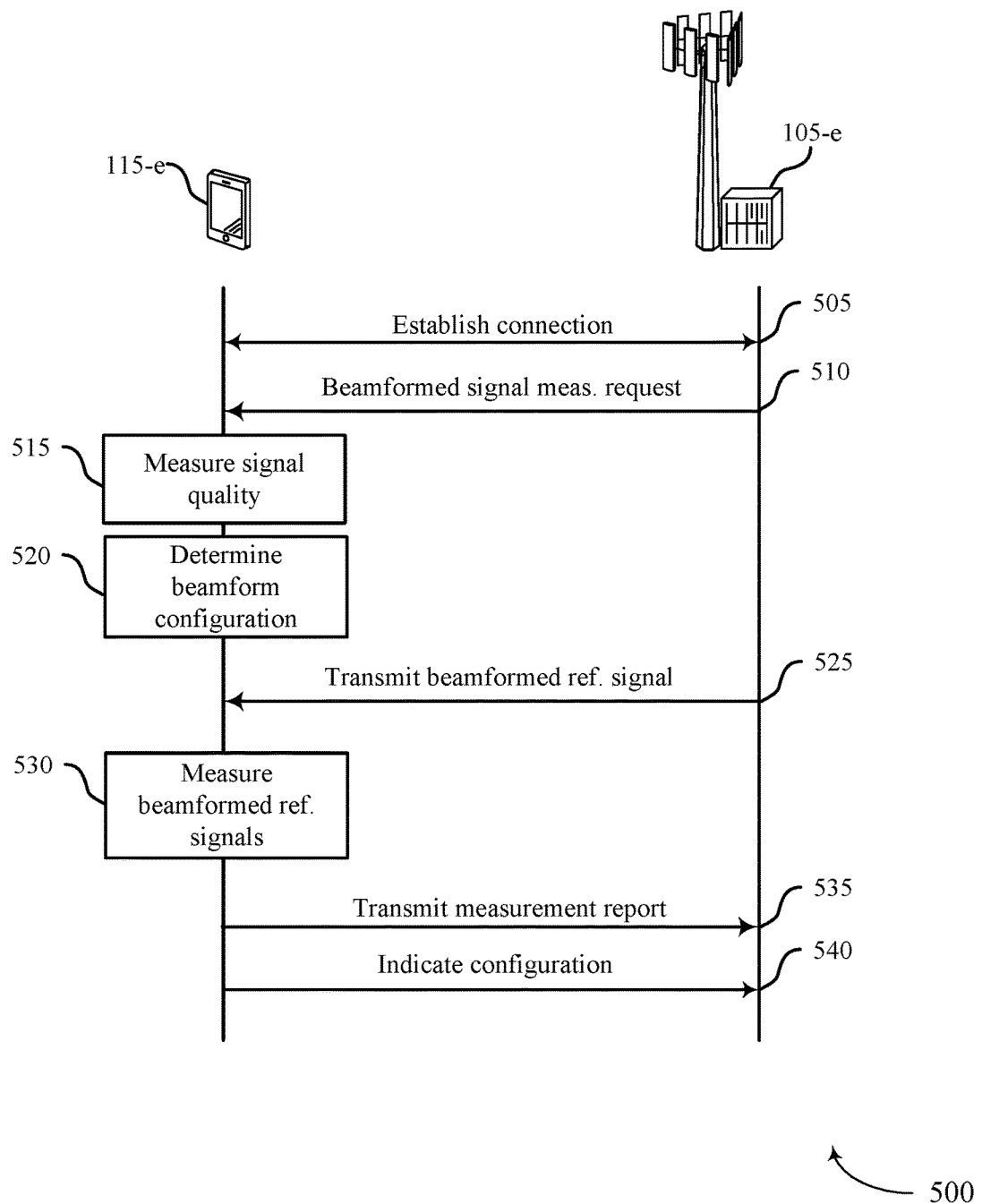
FIG. 5 illustrates an example of a process flow that supports receiver beamforming for measurements in accordance with aspects of the present disclosure.

FIG. 5 illustrates an example of a process flow 500 for receiver beamforming for measurements in accordance with aspects of the present disclosure. The process illustrated by process flow 500 may be implemented by a UE 115-e and a base station 105-e, which may be examples of a UE 115 and base station described with reference to FIGS. 1-3. In some examples, the process illustrated by flow diagram 500 may be implemented in a wireless system employing mmW communications.

At step 505, a connection may be established between UE 115-e and base station 105-e. Establishing the connection may including performing random access procedures and/or transmitting RRC signaling.

At step 510, the base station 105-e may transmit a request to the UE 115-e to measure one or more beamformed reference signals. The beamformed reference signals may include a MRS, a CSI-RS, a SYNC, or a combination thereof.

At step 515, the UE 115-d may measure and determine its receive signal quality. In some cases, the signal quality may be based on a RSRP, a RSRQ, a CQI, a SNR, or a combination thereof.

At step 520, the UE 115-e may determine a beamforming configuration for measuring and receiving beamformed reference signals from the base station 105-e, based at least in part on the signal quality measured at step 515. That is, the UE 115-e may determine which receiver beam pattern to use without first receiving an indication or instructions from the base station 105-d (e.g., autonomous determination). In some cases, the UE 115-e may use a directional configuration for measurements if the signal quality is below a threshold, and an omni-directional configuration if the signal quality is at or above the threshold. In some other cases, the receiver beam configuration used by the UE 115-e may be based on a previous indication by the base station 105-e or other characteristics of the UE 115-e (e.g., frequency of beam switches or the beam sweep pattern being used, as described with reference to FIGS. 2-3).

At step 525, the base station 105-e may transmit the beamformed reference signal to the UE 115-e.

At step 530, the UE 115-e may measure the beamformed reference signals, based at least in part on the receiver beamforming configuration determined at step 520.

At step 535, the UE 115-e may transmit a measurement report to the base station 105-e based on the reference signal received at step 525.

At step 540, the UE 115-e may indicate to the base station 105-e the beamforming configuration used for receiving and measuring the beamformed reference signal.

In some examples, the determined beam configuration may also be used for UL transmissions of reference signals from the UE 115-e. For example, at step 520, the UE 115-e may autonomously determine which transmit beam pattern (e.g., omni-directional or directional) to use for UL reference signal transmissions.

Figure 6:
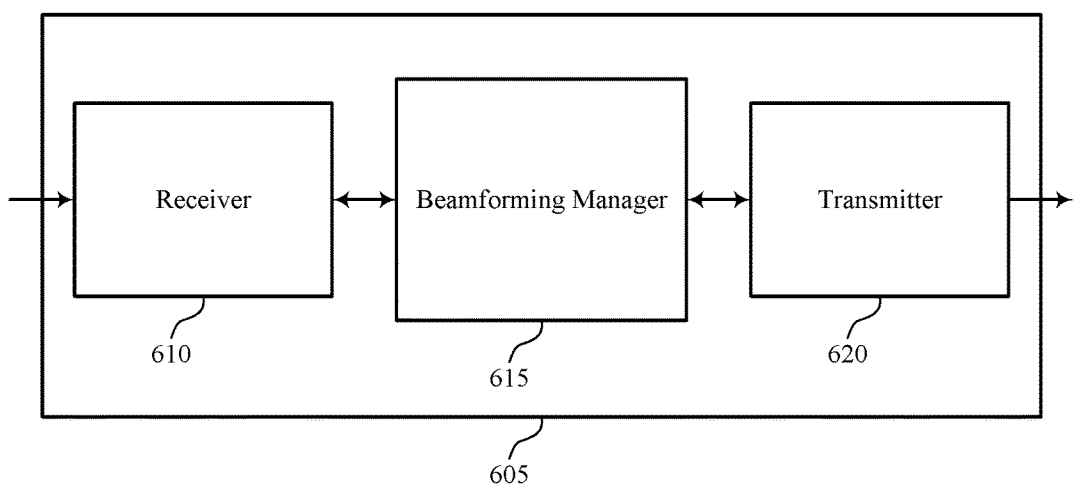
FIGS. 6 through 8 show block diagrams of a device that supports receiver beamforming for measurements in accordance with aspects of the present disclosure.

FIG. 6 shows a block diagram 600 of a wireless device 605 that supports receiver beamforming for measurements in accordance with various aspects of the present disclosure. Wireless device 605 may be an example of aspects of a UE 115 or base station 105 as described with reference to FIG. 1. Wireless device 605 may include receiver 610, beamforming manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to receiver beamforming for measurements, etc.). Information may be passed on to other components of the device. The receiver 610 may be an example of aspects of the transceiver 935 described with reference to FIG. 9.

Beamforming manager 615 may be an example of aspects of the beamforming manager 915 described with reference to FIG. 9.

Beamforming manager 615 may transmit a request to measure a beamformed reference signal. Furthermore, beamforming manager 615 may transmit a beamforming configuration indicating one or more beamforming options for measuring the beamformed reference signal, the one or more beamforming options including measuring the beamformed reference signal using a directional configuration and an omni-directional configuration.

The beamforming manager 615 may also receive a request to measure a beamformed reference signal. Furthermore, the beamforming manager 615 may receive a beamforming configuration indicating one or more beamforming options for measuring the beamformed reference signal, where the one or more beamforming options include measuring the beamformed reference signal using a directional configuration and an omni-directional configuration.

In some cases, the beamforming manager 615 may determine to use the directional configuration or the omni-directional configuration based on the beamforming configuration, and measure the beamformed reference signal based on the determination.

The beamforming manager 615 may also receive a request to measure a beamformed reference signal, determine a signal quality, determine to use a directional configuration or an omni-directional configuration to measure the beamformed reference signal based on the signal quality, and measure the beamformed reference signal based on the determination.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas. Furthermore, in some cases, transmitter 620 may transmit the beamformed reference signal.

Figure 7:
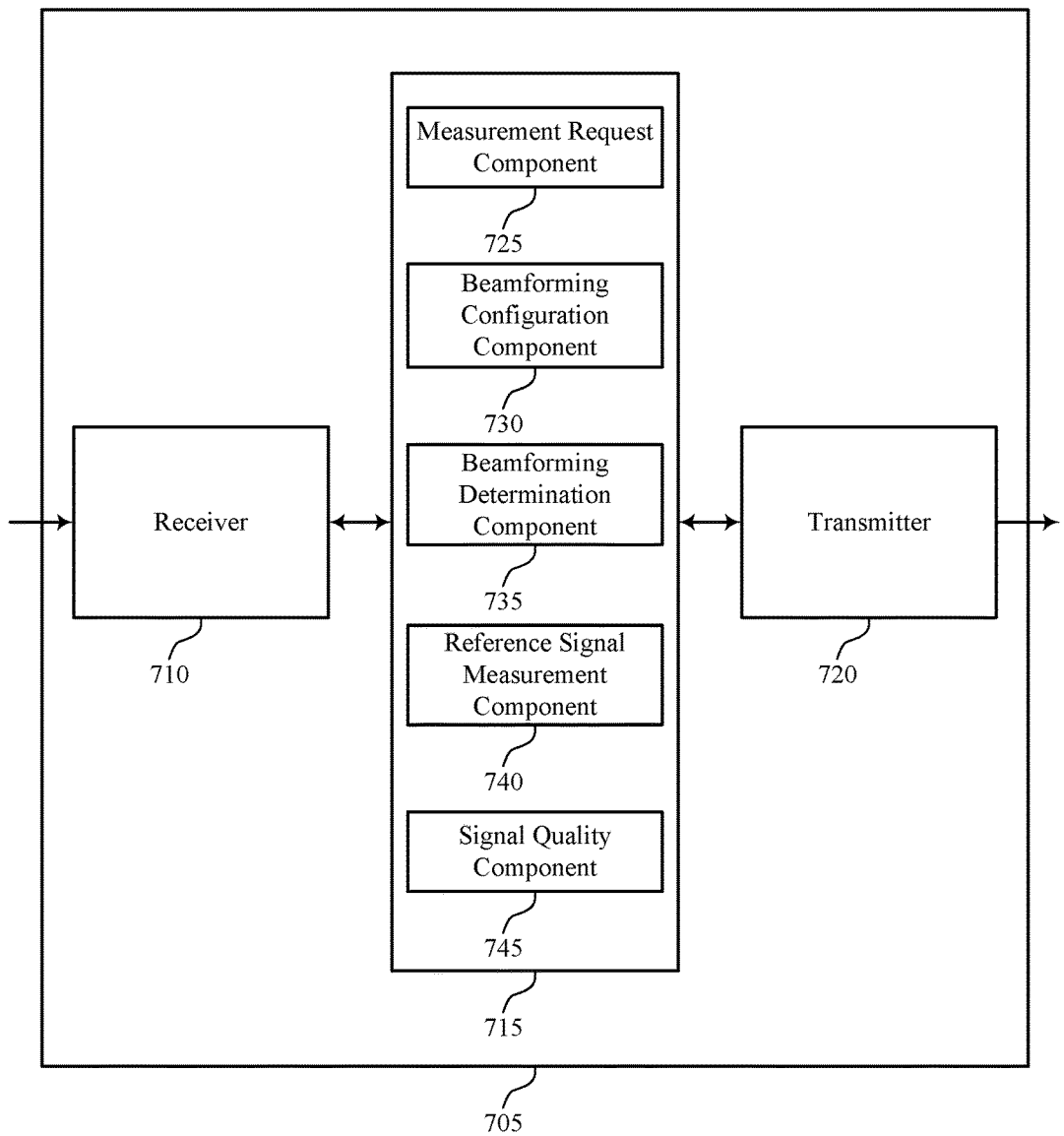

FIG. 7 shows a block diagram 700 of a wireless device 705 that supports receiver beamforming for measurements in accordance with various aspects of the present disclosure.

Wireless device 705 may be an example of aspects of a wireless device 605 or a UE 115 or base station 105 as described with reference to FIGS. 1 and 6. Wireless device 705 may include receiver 710, beamforming manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to receiver beamforming for measurements, etc.). Information may be passed on to other components of the device. The receiver 710 may be an example of aspects of the transceiver 935 described with reference to FIG. 9.

Beamforming manager 715 may be an example of aspects of the beamforming manager 915 described with reference to FIG. 9.

Beamforming manager 715 may also include measurement request component 725, beamforming configuration component 730, beamforming determination component 735, reference signal measurement component 740, and signal quality component 745.

Measurement request component 725 may transmit a request to measure a beamformed reference signal and receive a request to measure a beamformed reference signal. In some cases, the beamformed reference signal includes a MRS, a CSI-RS, a SYNC signal, or a combination thereof.

Beamforming configuration component 730 may transmit a beamforming configuration indicating one or more beamforming options for measuring the beamformed reference signal, the one or more beamforming options including measuring the beamformed reference signal using a directional configuration and an omni-directional configuration.

In some other cases, beamforming configuration component 730 may receive a beamforming configuration indicating one or more beamforming options for measuring the beamformed reference signal, where the one or more beamforming options include measuring the beamformed reference signal using a directional configuration and an omni-directional configuration.

Beamforming determination component 735 may determine to use the directional configuration or the omni-directional configuration based on the beamforming configuration. Beamforming determination component 735 may also transmit a message indicating whether the directional configuration or the omni-directional configuration was used to measure the beamformed reference signal.

In some other cases, beamforming determination component 735 may determine to use a directional configuration or an omni-directional configuration to measure the beamformed reference signal based on the signal quality. Furthermore, in some cases, beamforming determination component 735 may determine to use the omni-directional configuration if the signal quality is at or above a threshold, and the directional configuration if the signal quality is below the threshold. For instance, the beamforming determination component 735 may decide to use a directional beam for measurement if the signal quality at the UE, measured while using an omni-directional configuration or a directional configuration, is below a threshold. In other cases, the beamforming determination component 735 may decide to use an omni-directional beam for measurement if the signal quality at the UE, measured while using an omni-directional configuration or a directional configuration, is at or above a threshold.

Reference signal measurement component 740 may measure the beamformed reference signal based on the determination.

Signal quality component 745 may determine a signal quality. In some cases, the signal quality is based on an a RSRP, a RSRQ, a CQI, a SNR, or a combination thereof.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
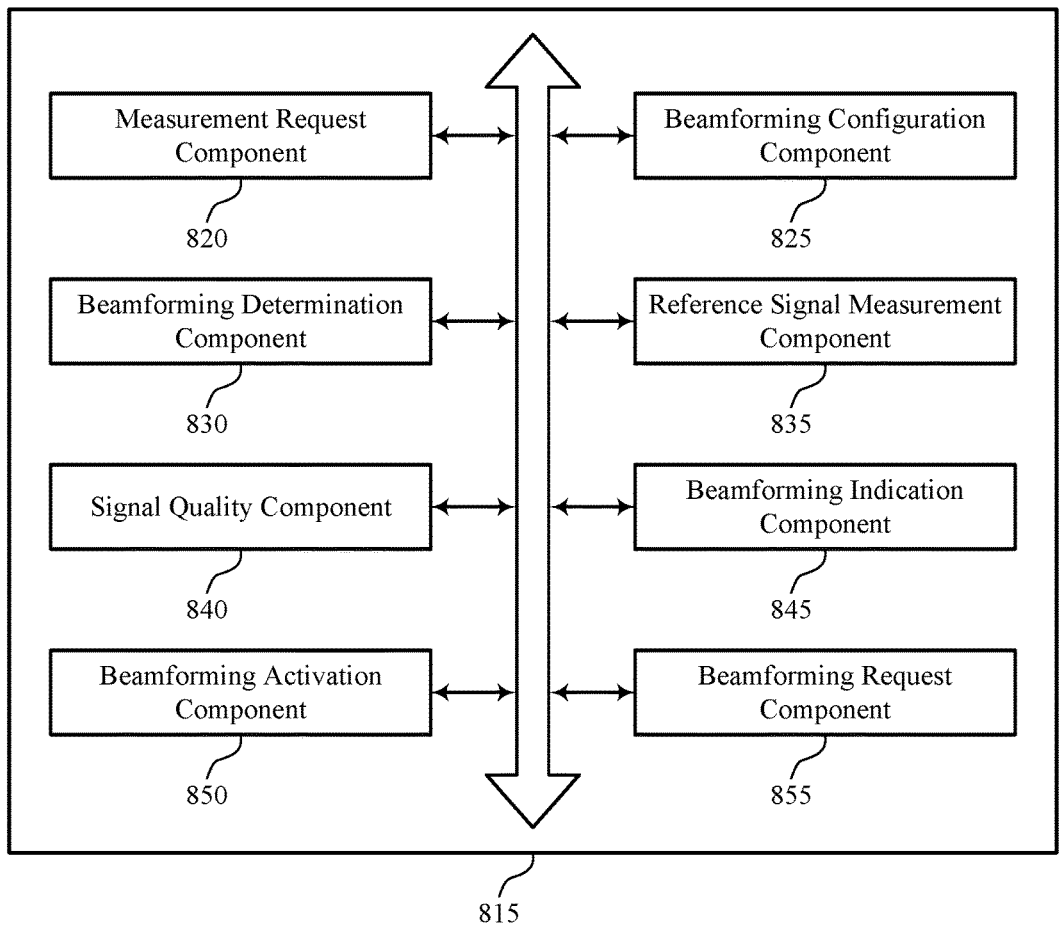

FIG. 8 shows a block diagram 800 of a beamforming manager 815 that supports receiver beamforming for measurements in accordance with various aspects of the present disclosure. The beamforming manager 815 may be an example of aspects of a beamforming manager 615, a beamforming manager 715, or a beamforming manager 915 described with reference to FIGS. 6, 7, and 9. The beamforming manager 815 may include measurement request component 820, beamforming configuration component 825, beamforming determination component 830, reference signal measurement component 835, signal quality component 840, beamforming indication component 845, beamforming activation component 850, and beamforming request component 855. Each of these modules may communicate, directly or indirectly, with one another (e.g., via one or more buses).

Measurement request component 820 may transmit a request to measure a beamformed reference signal and receive a request to measure a beamformed reference signal. In some cases, the beamformed reference signal includes a MRS, a CSI-RS, a SYNC signal such as a NR-SS, a PSS, a SSS, a DMRS, or a combination thereof.

Beamforming configuration component 825 may transmit a beamforming configuration indicating one or more beamforming options for measuring the beamformed reference signal, where the one or more beamforming options includes measuring the beamformed reference signal using a directional configuration and an omni-directional configuration.

In some other cases, beamforming configuration component 825 may receive a beamforming configuration indicating one or more beamforming options for measuring the beamformed reference signal, where the one or more beamforming options includes measuring the beamformed reference signal using a directional configuration and an omni-directional configuration.

Beamforming determination component 830 may determine to use the directional configuration or the omni-directional configuration based on the beamforming configuration, transmit a message indicating whether the directional configuration or the omni-directional configuration was used to measure the beamformed reference signal.

In some other cases, beamforming determination component 830 may determine to use a directional configuration or an omni-directional configuration to measure the beamformed reference signal based on the signal quality. Furthermore, in some cases, beamforming determination component 830 may determine to use the omni-directional configuration if the signal quality is at or above a threshold, and the directional configuration if the signal quality is below the threshold. For instance, the beamforming determination component 830 may decide to use a directional beam for measurement if the signal quality at the UE, measured while using an omni-directional configuration or a directional configuration, is below a threshold. In other cases, the beamforming determination component 830 may decide to use an omni-directional beam for measurement if the signal quality at the UE, measured while using an omni-directional configuration or a directional configuration, is at or above a threshold.

Reference signal measurement component 835 may measure the beamformed reference signal based on the determination.

Signal quality component 840 may determine a signal quality. In some cases, the signal quality is based on a RSRP, a RSRQ, a CQI, a SNR, or a combination thereof.

Beamforming indication component 845 may transmit an indication of whether to use the directional configuration or the omni-directional configuration to measure the beamformed reference signal. In some cases, beamforming indication component 845 may determine that a frequency of beam switches is at or above a threshold, where the indication indicates use of the omni-directional configuration.

In some other cases, beamforming indication component 845 may receive an indication of whether to use the directional configuration or the omni-directional configuration to measure the beamformed reference signal. Furthermore, in some cases, beamforming indication component 845 may determine to use the directional configuration if the indication indicates use of the omni-directional configuration or the directional configuration if the indication indicates use of the omni-directional configuration.

In some cases, the indication indicates use of the omni-directional configuration when a signal quality is at or above a threshold, and indicates use of the directional configuration when the signal quality is below the threshold. In some cases, the signal quality is based on a RSRP, a RSRQ, a CQI, a SNR, or a combination thereof. In some cases, the indication indicates a beam shape to use to measure the beamformed reference signal, where the beam shape includes a beam width, an array gain, a beam direction, or a combination thereof.

In some cases, the indication indicates use of the omni-directional configuration when the beamformed reference signal overlaps with a reference signal from a neighboring transmitter. In some cases, the indication indicates use of both the directional configuration and the omni-directional configuration. In some cases, the indication includes a beam sweep pattern that includes a repeated reference signal in a set of symbols to indicate use of the omni-directional configuration.

Beamforming activation component 850 may transmit an activation message to activate or deactivate the one or more beamforming options.

Beamforming request component 855 may transmit a configuration request requesting a reference signal beam sweep type that is compatible with the omni-directional configuration.

Figure 9:
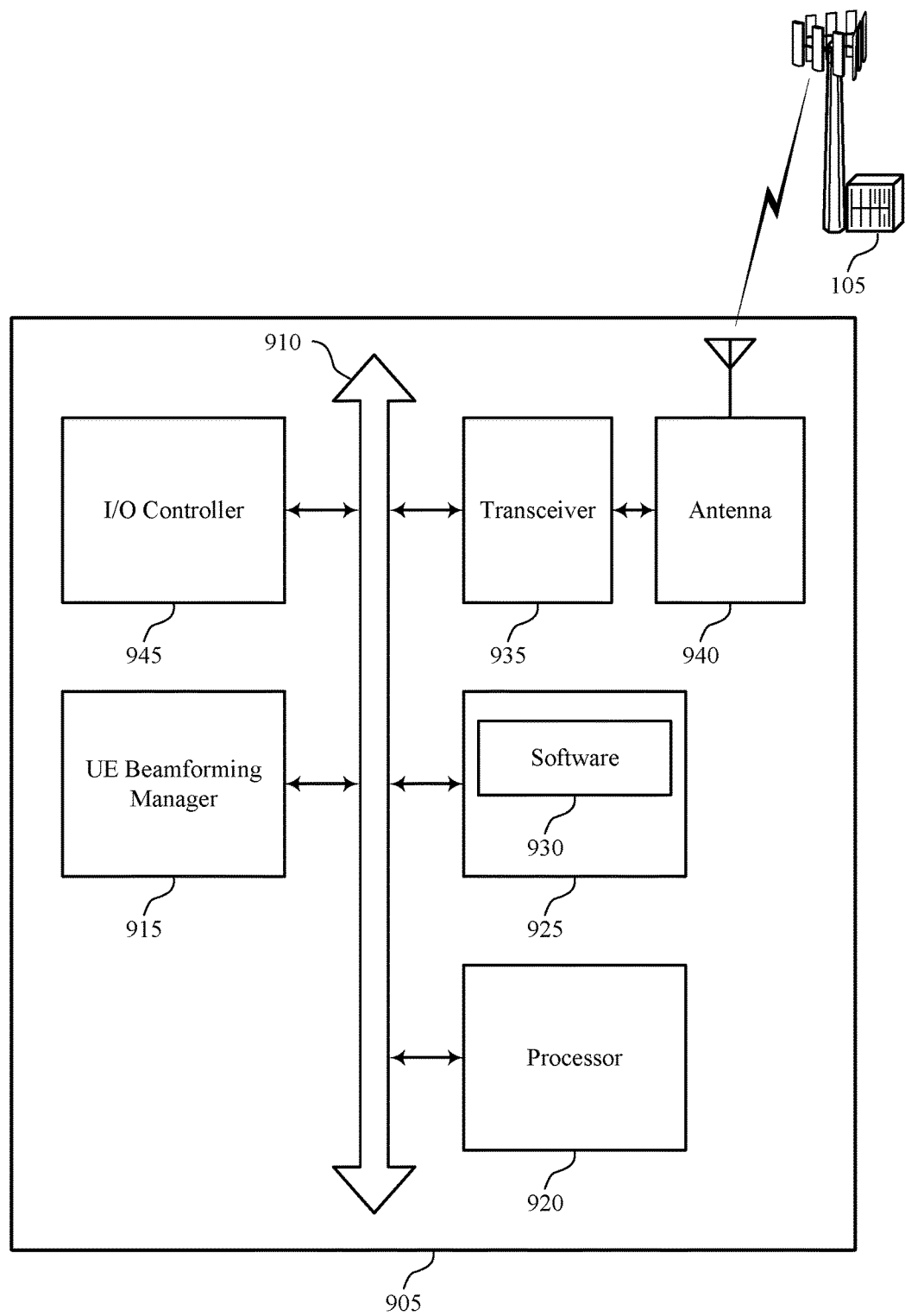
FIG. 9 illustrates a block diagram of a system including a user equipment (UE) that supports receiver beamforming for measurements in accordance with aspects of the present disclosure.

FIG. 9 shows a diagram of a system 900 including a device 905 that supports receiver beamforming for measurements in accordance with various aspects of the present disclosure. Device 905 may be an example of or include the components of wireless device 605, wireless device 705, or a UE 115 as described above, e.g., with reference to FIGS. 1, 6 and 7. Device 905 may include components for bi-directional voice and data communications including components for transmitting and receiving communications, including UE beamforming manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting receiver beamforming for measurements).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support receiver beamforming for measurements. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system.

Figure 10:
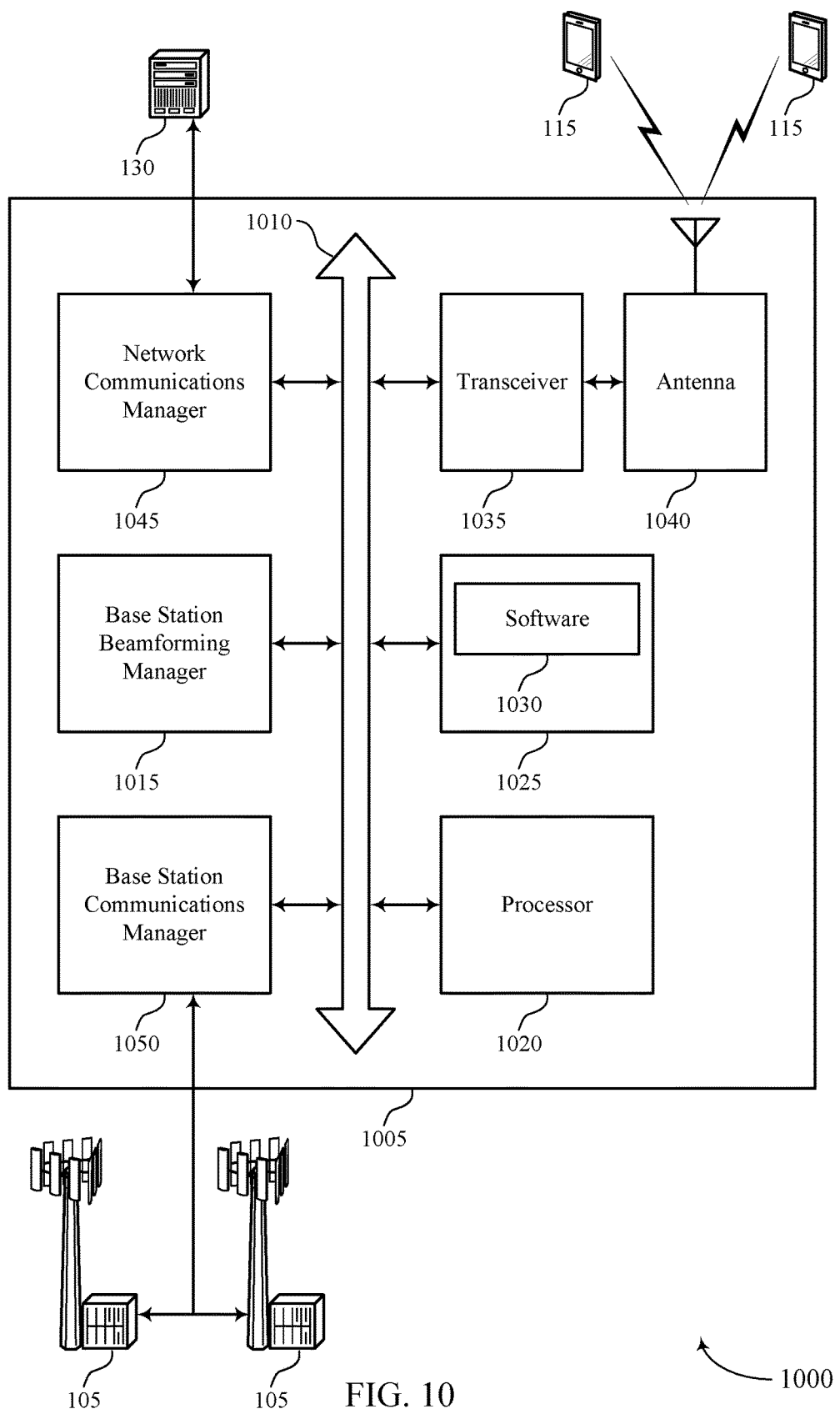
FIG. 10 illustrates a block diagram of a system including a base station that supports receiver beamforming for measurements in accordance with aspects of the present disclosure.

FIG. 10 shows a diagram of a system 1000 including a device 1005 that supports receiver beamforming for measurements in accordance with various aspects of the present disclosure. Device 1005 may be an example of or include the components of wireless device 705, wireless device 805, or a base station 105 as described above, e.g., with reference to FIGS. 1, 7 and 8. Device 1005 may include components for bi-directional voice and data communications including components for transmitting and receiving communications, including base station beamforming manager 1015, processor 1020, memory 1025, software 1030, transceiver 1035, antenna 1040, network communications manager 1045, and base station communications manager 1050. These components may be in electronic communication via one or more busses (e.g., bus 1010). Device 1005 may communicate wirelessly with one or more UEs 115.

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting receiver beamforming for measurements).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware and/or software operation such as the interaction with peripheral components or devices.

Software 1030 may include code to implement aspects of the present disclosure, including code to support receiver beamforming for measurements. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Base station communications manager 1050 may manage communications with other base station 105, and may include a controller or scheduler for controlling communications with UEs 115 in cooperation with other base stations 105. For example, the base station communications manager 1050 may coordinate scheduling for transmissions to UEs 115 for various interference mitigation techniques such as beamforming or joint transmission. In some examples, base station communications manager 1050 may provide a X2 interface within a LTE/LTE-A wireless communication network technology to provide communication between base stations 105.

Figure 11:
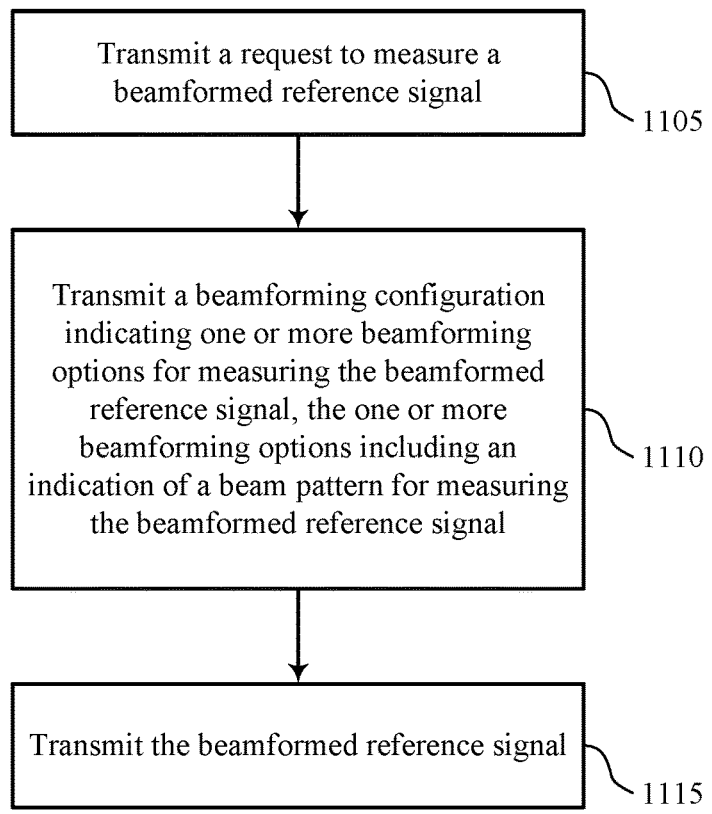
FIGS. 11 through 13 illustrate methods for receiver beamforming for measurements in accordance with aspects of the present disclosure.

FIG. 11 shows a flowchart illustrating a method 1100 for receiver beamforming for measurements in accordance with various aspects of the present disclosure. The operations of method 1100 may be implemented by a UE 115 or base station 105 or its components as described herein. For example, the operations of method 1100 may be performed by a beamforming manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1105 the UE 115 or base station 105 may transmit a request to measure a beamformed reference signal. The operations of block 1105 may be performed according to the methods described with reference to FIGS. 1 through 5. In certain examples, aspects of the operations of block 1105 may be performed by a measurement request component as described with reference to FIGS. 6 through 8.

At block 1110 the UE 115 or base station 105 may transmit a beamforming configuration indicating one or more beamforming options for measuring the beamformed reference signal, the one or more beamforming options including an indication of a beam pattern for measuring the beamformed reference signal. In some cases, the one or more beamforming options may further include using a directional configuration, an omni-directional configuration, or a combination, for measuring the beamformed reference signal. The operations of block 1110 may be performed according to the methods described with reference to FIGS. 1 through 5. In certain examples, aspects of the operations of block 1110 may be performed by a beamforming configuration component as described with reference to FIGS. 6 through 8.

At block 1115 the UE 115 or base station 105 may transmit the beamformed reference signal. The operations of block 1115 may be performed according to the methods described with reference to FIGS. 1 through 5. In certain examples, aspects of the operations of block 1115 may be performed by a transmitter as described with reference to FIGS. 6 through 8.

Figure 12:
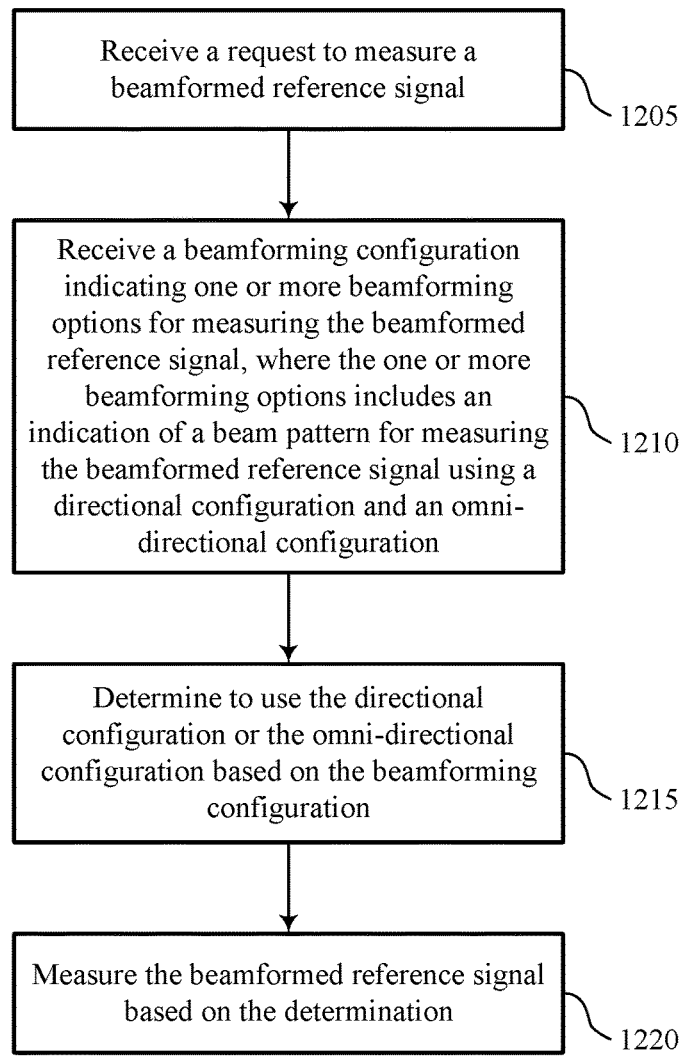

FIG. 12 shows a flowchart illustrating a method 1200 for receiver beamforming for measurements in accordance with various aspects of the present disclosure. The operations of method 1200 may be implemented by a UE 115 or base station 105 or its components as described herein. For example, the operations of method 1200 may be performed by a beamforming manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1205 the UE 115 or base station 105 may receive a request to measure a beamformed reference signal. The operations of block 1205 may be performed according to the methods described with reference to FIGS. 1 through 5. In certain examples, aspects of the operations of block 1205 may be performed by a measurement request component as described with reference to FIGS. 6 through 8.

At block 1210 the UE 115 or base station 105 may receive a beamforming configuration indicating one or more beamforming options for measuring the beamformed reference signal, wherein the one or more beamforming options includes an indication of a beam pattern for measuring the beamformed reference signal. In some cases, the one or more beamforming options may further include using a directional configuration, an omni-directional configuration, or a combination, for measuring the beamformed reference signal. The operations of block 1210 may be performed according to the methods described with reference to FIGS. 1 through 5. In certain examples, aspects of the operations of block 1210 may be performed by a beamforming configuration component as described with reference to FIGS. 6 through 8.

At block 1215 the UE 115 or base station 105 may determine to use the directional configuration or the omni-directional configuration based at least in part on the beamforming configuration. The operations of block 1215 may be performed according to the methods described with reference to FIGS. 1 through 5. In certain examples, aspects of the operations of block 1215 may be performed by a beamforming determination component as described with reference to FIGS. 6 through 8.

At block 1220 the UE 115 or base station 105 may measure the beamformed reference signal based at least in part on the determination. The operations of block 1220 may be performed according to the methods described with reference to FIGS. 1 through 5. In certain examples, aspects of the operations of block 1220 may be performed by a reference signal measurement component as described with reference to FIGS. 6 through 8.

Figure 13:
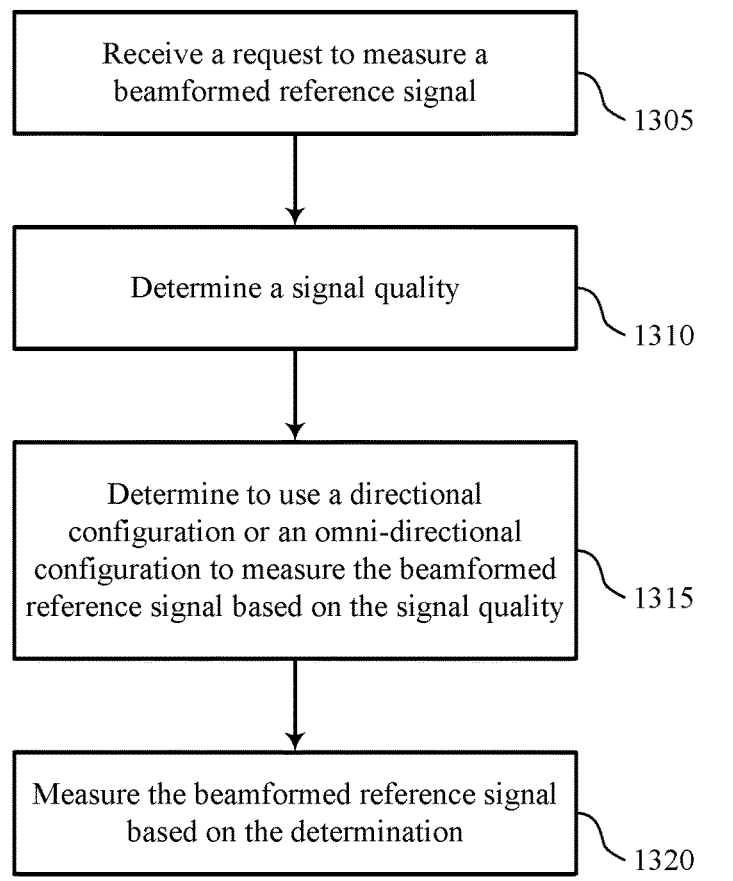

FIG. 13 shows a flowchart illustrating a method 1300 for receiver beamforming for measurements in accordance with various aspects of the present disclosure. The operations of method 1300 may be implemented by a UE 115 or base station 105 or its components as described herein. For example, the operations of method 1300 may be performed by a beamforming manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1305 the UE 115 or base station 105 may receive a request to measure a beamformed reference signal. The operations of block 1305 may be performed according to the methods described with reference to FIGS. 1 through 5. In certain examples, aspects of the operations of block 1305 may be performed by a measurement request component as described with reference to FIGS. 6 through 8.

At block 1310 the UE 115 or base station 105 may determine a signal quality. The operations of block 1310 may be performed according to the methods described with reference to FIGS. 1 through 5. In certain examples, aspects of the operations of block 1310 may be performed by a signal quality component as described with reference to FIGS. 6 through 8.

At block 1315 the UE 115 or base station 105 may determine to use a directional configuration or an omni-directional configuration to measure the beamformed reference signal based at least in part on the signal quality. The operations of block 1315 may be performed according to the methods described with reference to FIGS. 1 through 5. In certain examples, aspects of the operations of block 1315 may be performed by a beamforming determination component as described with reference to FIGS. 6 through 8.

At block 1320 the UE 115 or base station 105 may measure the beamformed reference signal based at least in part on the determination. The operations of block 1320 may be performed according to the methods described with reference to FIGS. 1 through 5. In certain examples, aspects of the operations of block 1320 may be performed by a reference signal measurement component as described with reference to FIGS. 6 through 8.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, a TRP, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   transmitting, to a user equipment (UE), a request to measure a beamformed reference signal;
   transmitting, to the UE, a beamforming configuration indicating a plurality of beamformed measuring options for measuring the beamformed reference signal;
   transmitting an activation message to activate one or more beamformed measuring options of the plurality of beamformed measuring options, the activated one or more beamformed measuring options indicating a beam pattern for measuring the beamformed reference signal, wherein the beam pattern indicates a directional receive parameter associated with the beamformed reference signal; and
   transmitting the beamformed reference signal.

2. The method of claim 1, wherein the plurality of beamformed measuring options include measuring the beamformed reference signal using a directional configuration and an omni-directional configuration.

3. The method of claim 2, further comprising:
   transmitting an indication of whether to use the directional configuration or the omni-directional configuration to measure the beamformed reference signal.

4. The method of claim 3, wherein the indication indicates use of the omni-directional configuration when a signal quality is at or above a threshold, and indicates use of the directional configuration when the signal quality is below the threshold.

5. The method of claim 4, wherein the indication indicates use of the omni-directional configuration when the signal quality measured using the omni-directional configuration or the directional configuration is at or above the threshold.

6. The method of claim 4, wherein the indication indicates use of the directional configuration when the signal quality measured using the omni-directional configuration or the directional configuration is below the threshold.

7. The method of claim 4, wherein the signal quality is based at least in part on a reference signal received power (RSRP), a reference signal received quality (RSRQ), a channel quality indicator (CQI), a signal-to-noise ratio (SNR), or a combination thereof.

8. The method of claim 3, wherein the indication indicates a measuring beam shape to use to measure the beamformed reference signal, wherein the measuring beam shape comprises a beam width, an array gain, a beam direction, or a combination thereof.

9. The method of claim 3, wherein the indication indicates use of the omni-directional configuration when the beamformed reference signal overlaps with a reference signal from a neighboring transmitter.

10. The method of claim 3, wherein the indication indicates use of both the directional configuration and the omni-directional configuration.

11. The method of claim 3, wherein the indication comprises a measuring beam sweep pattern that comprises a repeated reference signal in a plurality of symbols to indicate use of the omni-directional configuration.

12. The method of claim 3, further comprising:
    determining that a frequency of beam switches is at or above a threshold, wherein the indication indicates use of the omni-directional configuration based at least in part on the determination.

13. The method of claim 1, wherein the plurality of beamformed measuring options includes a first configuration associated with a first measuring beam formable at the UE and a second configuration associated with a second measuring beam formable at the UE.

14. The method of claim 1, wherein the beam pattern for measuring the beamformed reference signal is based at least in part on a transmitting beam pattern, and wherein the beamformed reference signal is transmitted in accordance with the transmitting beam pattern.

15. A method for wireless communication at a user equipment (UE), comprising:
    receiving a request to measure a beamformed reference signal;
    receiving a beamforming configuration indicating a plurality of beamformed measuring options for measuring the beamformed reference signal;
    receiving an activation message to activate one or more beamformed measuring options of the plurality of beamformed measuring options, the activated one or more beamformed measuring options indicating a beam pattern for measuring the beamformed reference signal, wherein the beam pattern indicates a directional receive parameter associated with the beamformed reference signal; and
    measuring the beamformed reference signal using the beam pattern based at last in part on the direction receive parameter.

16. The method of claim 15, wherein the plurality of beamformed measuring options include measuring the beamformed reference signal using a directional configuration and an omni-directional configuration.

17. The method of claim 16, further comprising:
    receiving an indication of whether to use the directional configuration or the omni-directional configuration to measure the beamformed reference signal.

18. The method of claim 17, further comprising:
    determining to use the directional configuration if the indication indicates use of the directional configuration or determining to use the omni-directional configuration if the indication indicates use of the omni-directional configuration.

19. The method of claim 16, further comprising:
    transmitting a message indicating whether the directional configuration or the omni-directional configuration was used to measure the beamformed reference signal.

20. The method of claim 16, further comprising:
transmitting a configuration request requesting a reference signal beam sweep type that is compatible with the omni-directional configuration.

21. An apparatus for wireless communication, comprising:
a processor;
memory coupled with the processor; and
instructions stored in the memory and operable, when executed by the processor, to cause the apparatus to:
transmit, to a user equipment (UE), a request to measure a beamformed reference signal;
transmit, to the UE, a beamforming configuration indicating a plurality of beamformed measuring options for measuring the beamformed reference signal;
transmit an activation message to activate one or more beamformed measuring options of the plurality of beamformed measuring options, the activated one or more beamformed measuring options indicating a beam pattern for measuring the beamformed reference signal, wherein the beam pattern indicates a directional receive parameter associated with the beamformed reference signal; and
transmit the beamformed reference signal.

22. The apparatus of claim 21, wherein the plurality of beamformed measuring options include measuring the beamformed reference signal using a directional configuration and an omni-directional configuration.

23. The apparatus of claim 22, wherein the instructions are further executable by the processor to:
transmit an indication of whether to use the directional configuration or the omni-directional configuration to measure the beamformed reference signal.

24. The apparatus of claim 23, wherein the indication indicates use of the omni-directional configuration when a signal quality is at or above a threshold, and indicates use of the directional configuration when the signal quality is below the threshold.

25. The apparatus of claim 24, wherein the signal quality is based at least in part on a reference signal received power (RSRP), a reference signal received quality (RSRQ), a channel quality indicator (CQI), a signal-to-noise ratio (SNR), or a combination thereof.

26. The apparatus of claim 23, wherein the indication indicates a measuring beam shape to use to measure the beamformed reference signal, wherein the measuring beam shape comprises a beam width, an array gain, a beam direction, or a combination thereof.

27. An apparatus for wireless communication at a user equipment (UE), comprising:
a processor;
memory coupled with the processor; and
instructions stored in the memory and operable, when executed by the processor, to cause the apparatus to:
receive a request to measure a beamformed reference signal;
receive a beamforming configuration indicating a plurality of beamformed measuring options for measuring the beamformed reference signal;
receive an activation message to activate one or more beamformed measuring options of the plurality of beamformed measuring options, the activated one or more beamformed measuring options indicating a beam pattern for measuring the beamformed reference signal, wherein the beam pattern indicates a directional receive parameter associated with the beamformed reference signal; and
measure the beamformed reference signal using the beam pattern based at last in part on the direction receive parameter.

28. The apparatus of claim 27, wherein the plurality of beamformed measuring options include measuring the beamformed reference signal using a directional configuration and an omni-directional configuration.

29. The apparatus of claim 28, wherein the instructions are further executable by the processor to:
receive an indication of whether to use the directional configuration or the omni-directional configuration to measure the beamformed reference signal.

30. The apparatus of claim 29, wherein the instructions are further executable by the processor to:
determine to use the directional configuration if the indication indicates use of the directional configuration or determining to use the omni-directional configuration if the indication indicates use of the omni-directional configuration.

* * * * *